(12) United States Patent
Lee et al.

(10) Patent No.: US 10,694,365 B2
(45) Date of Patent: Jun. 23, 2020

(54) METHOD AND APPARATUS FOR NETWORK VIRTUALIZATION AND SESSION MANAGEMENT

(71) Applicant: Samsung Electronics Co., Ltd., Gyeonggi-do (KR)

(72) Inventors: Hoyeon Lee, Seoul (KR); Kyungjoo Suh, Seoul (KR); Youngkyo Baek, Seoul (KR); Sunghoon Kim, Seoul (KR); Jungje Son, Gyeonggi-do (KR); Andrew Bennett, Surrey (GB); Jungshin Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 6 days.

(21) Appl. No.: 16/012,050

(22) Filed: Jun. 19, 2018

(65) Prior Publication Data

US 2018/0367980 A1    Dec. 20, 2018

(30) Foreign Application Priority Data

Jun. 19, 2017    (KR) .......................... 10-2017-0077569

(51) Int. Cl.
| | | |
|---|---|---|
| *H04W 8/08* | (2009.01) | |
| *H04W 60/00* | (2009.01) | |
| *H04L 29/08* | (2006.01) | |
| *H04W 36/14* | (2009.01) | |
| *H04W 48/08* | (2009.01) | |
| *H04W 48/16* | (2009.01) | |
| *H04W 48/18* | (2009.01) | |

(52) U.S. Cl.
CPC ............... *H04W 8/08* (2013.01); *H04L 67/14* (2013.01); *H04L 67/16* (2013.01); *H04W 36/14* (2013.01); *H04W 48/08* (2013.01); *H04W 48/16* (2013.01); *H04W 60/00* (2013.01); *H04W 48/18* (2013.01)

(58) Field of Classification Search
CPC ....... H04W 8/08; H04W 60/00; H04W 48/08; H04W 36/14; H04W 48/16; H04L 67/14; H04L 67/16
See application file for complete search history.

(56) References Cited

U.S. PATENT DOCUMENTS

| | | | |
|---|---|---|---|
| 2016/0353367 A1 | 12/2016 | Vrzic et al. | |
| 2017/0303259 A1* | 10/2017 | Lee ......................... | H04W 28/16 |
| 2018/0332523 A1* | 11/2018 | Faccin ................. | H04W 36/385 |
| 2018/0352483 A1* | 12/2018 | Youn ...................... | H04W 76/18 |

(Continued)

OTHER PUBLICATIONS

InterDigital, Samsung, "Updates to the Registration Procedure", S2-172813, SA WG2 Meeting #120, Mar. 27-31, 2017, 7 pages.

(Continued)

*Primary Examiner* — Charles C Jiang
*Assistant Examiner* — Voster Preval
(74) *Attorney, Agent, or Firm* — The Farrell Law Firm, P.C.

(57) ABSTRACT

A communication method of an access and mobility function (AMF) node in a communication system is provided. The communication method includes receiving, from a base station, a registration request message for a terminal, transmitting, to an old AMF previously accessed by the terminal, an information request message for the terminal, and receiving, from the old AMF, an information response message including network slice selection assistance information (NSSAI) corresponding to the terminal.

14 Claims, 21 Drawing Sheets

(56) References Cited

U.S. PATENT DOCUMENTS

2019/0029065 A1* 1/2019 Park ................... H04W 60/06
2019/0191349 A1* 6/2019 Kim .................... H04W 36/14

OTHER PUBLICATIONS

Nokia, Alcatel-Lucent Shanghai Bell, "On NSI and Network Function Selection in Network Slicing Environment", S2-173453, SA WG2 Meeting #121, May 15-19, 2017, 3 pages.
3rd Generation Partnership Project; Technical Specification Group Services and System Aspects; System Architecture for the 5G System; Stage 2, (Release 15), 3GPP TS 23.501 V0.5.0, May 2017, 145 pages.
3rd Generation Partnership Project; Technical Specification Group Services and System Aspects; Procedures for the 5G System, Stage 2, (Release 15), 3GPP TS 23.502 V0.4.0, May 2017, 126 pages.
European Search Report dated Nov. 13, 2018 issued in counterpart application No. 18178477.8-1214, 11 pages.

* cited by examiner

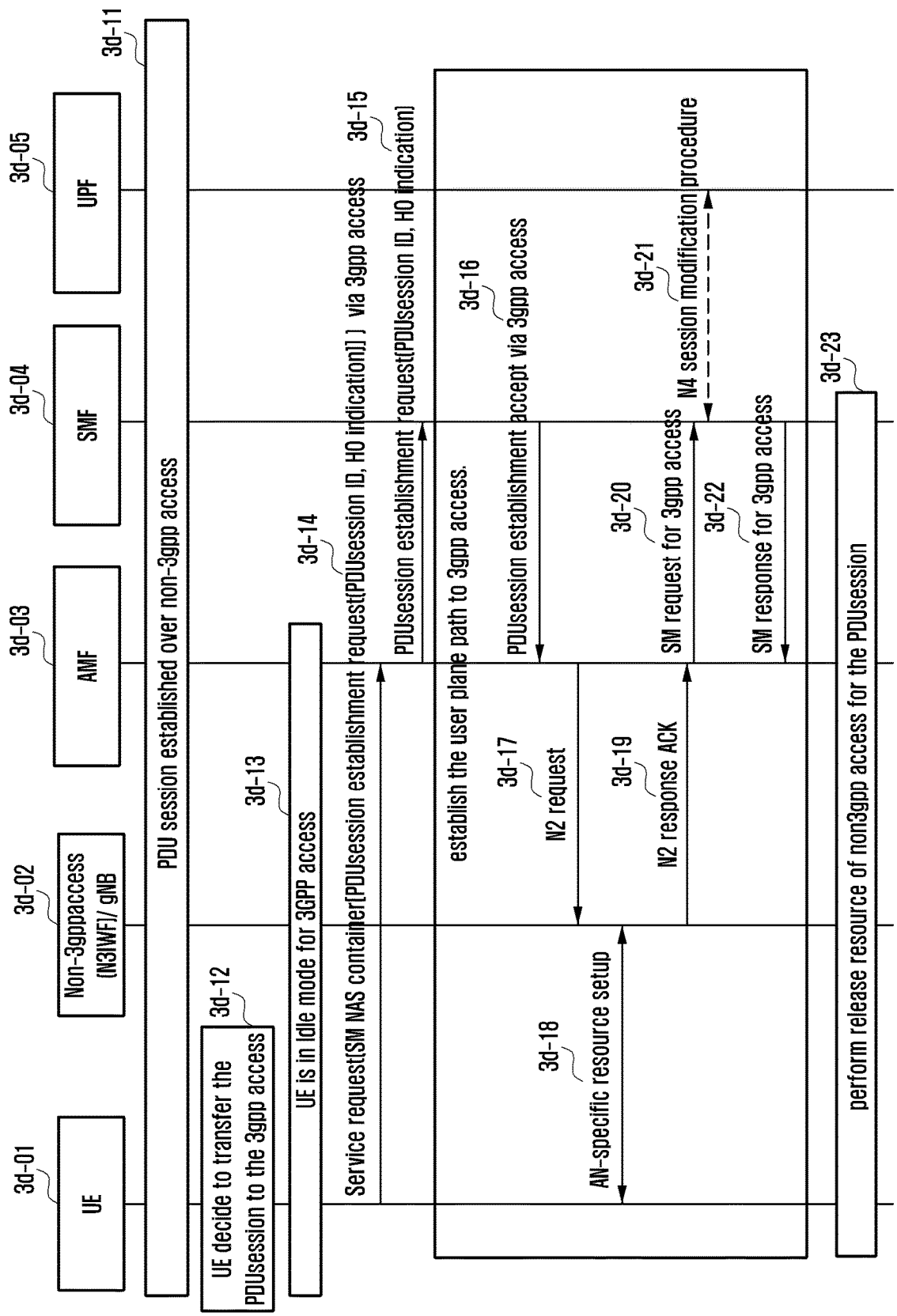

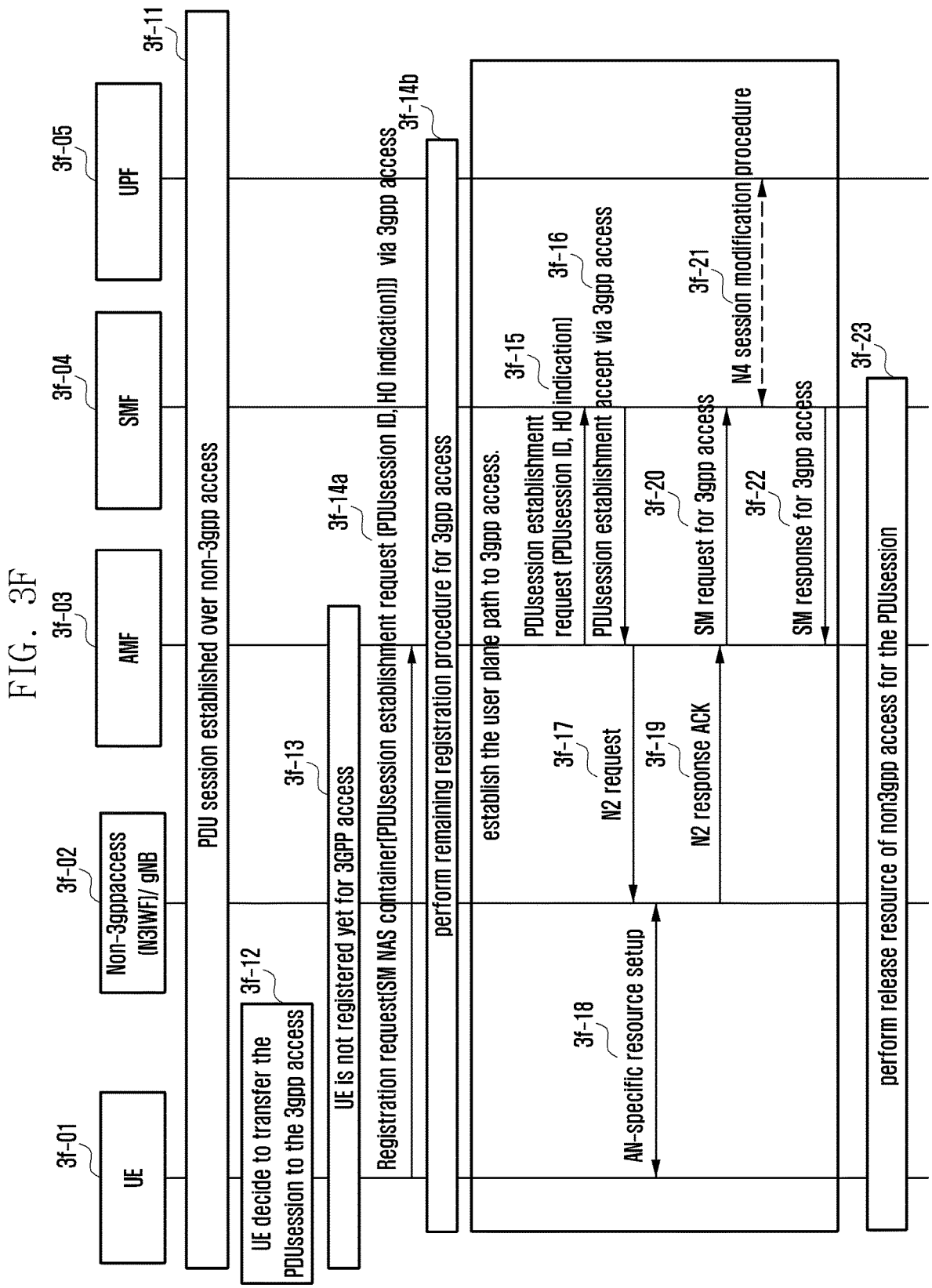

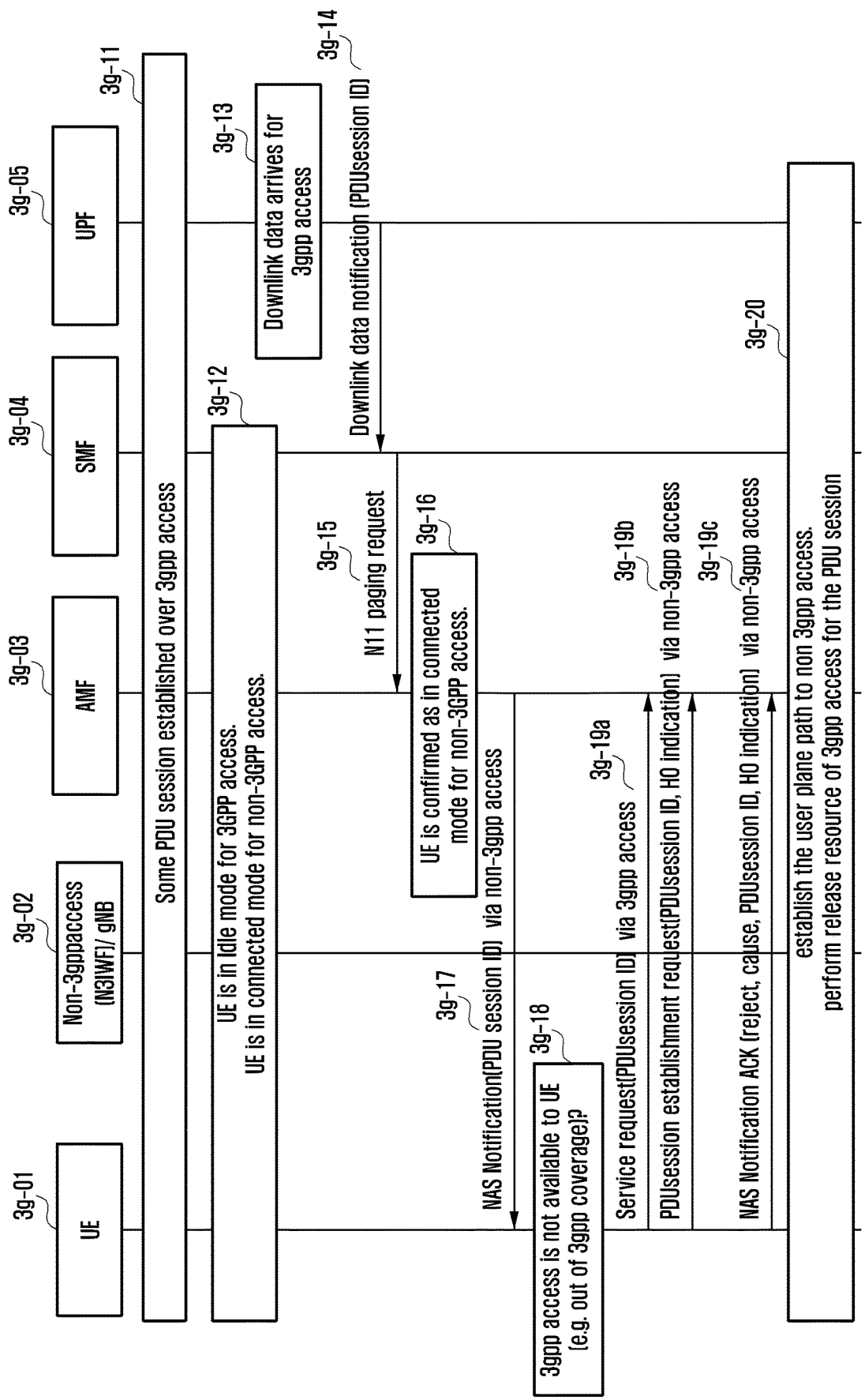

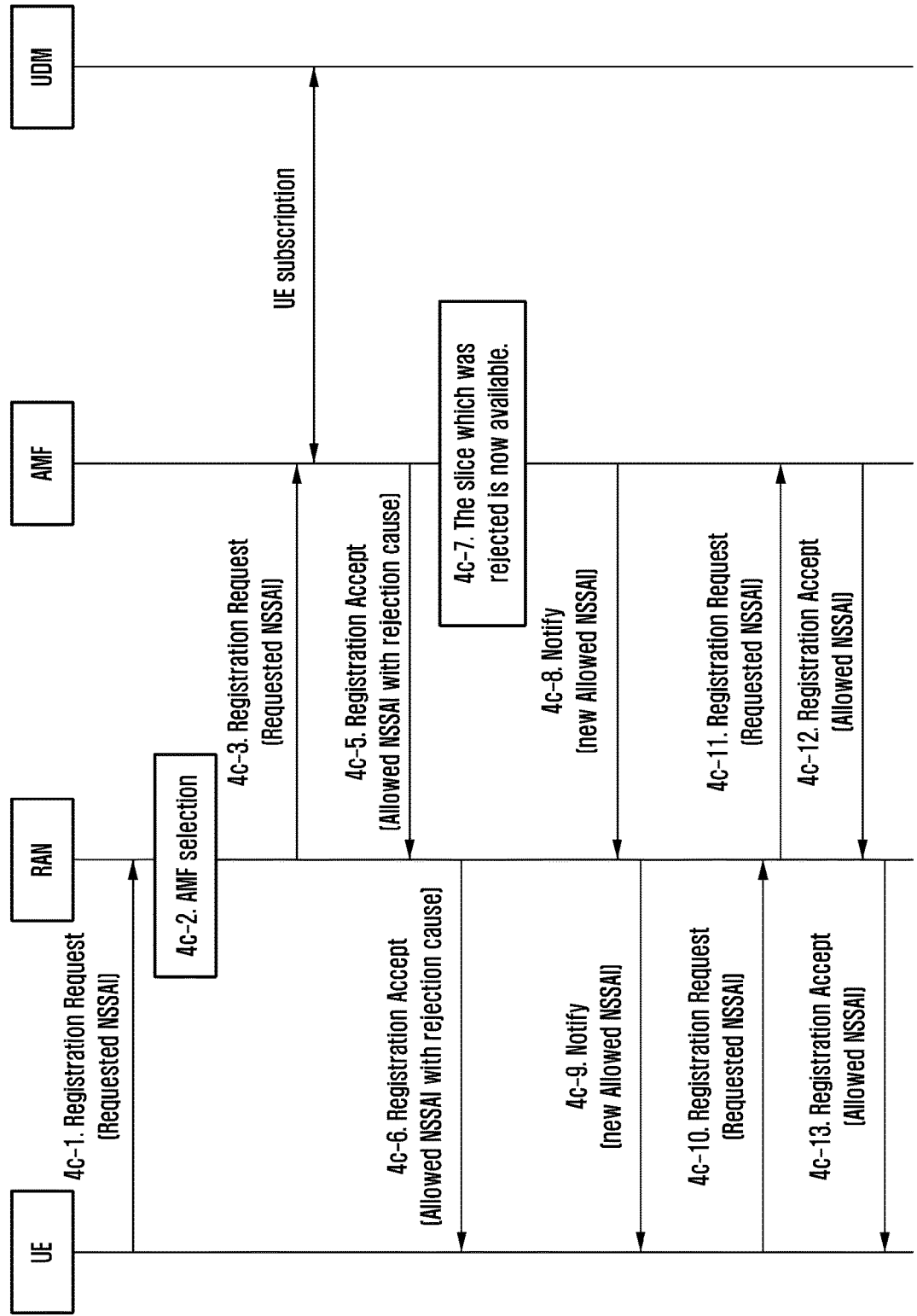

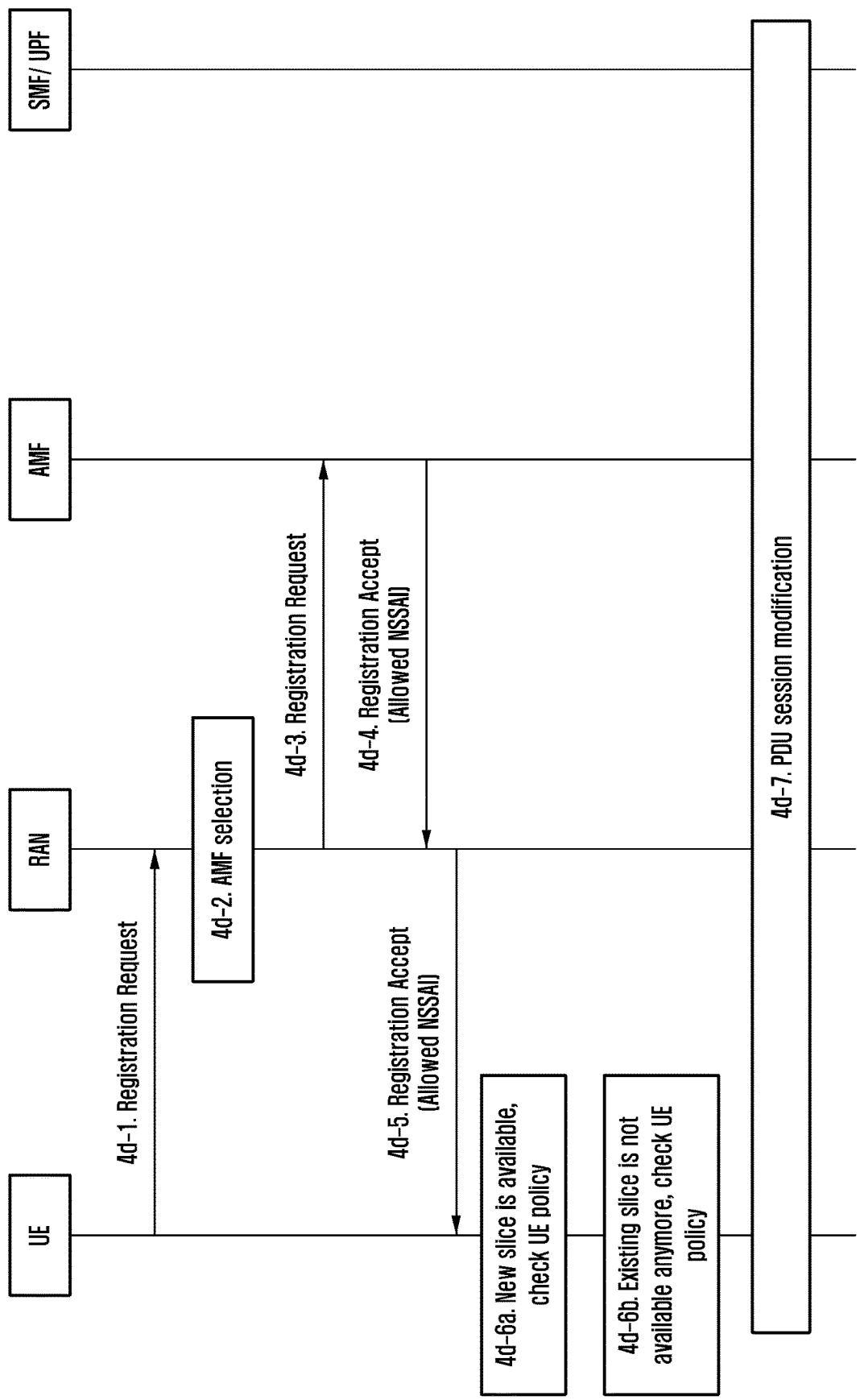

METHOD AND APPARATUS FOR NETWORK VIRTUALIZATION AND SESSION MANAGEMENT

CROSS-REFERENCE TO RELATED APPLICATION(S)

This application is based on and claims priority under 35 U.S.C. § 119 to Korean Patent Application Serial No. 10-2017-0077569, filed on Jun. 19, 2017, in the Korean Intellectual Property Office, the entire disclosure of which is incorporated herein by reference.

BACKGROUND

1. Field

The disclosure relates, generally, to a method and apparatus, and more particularly, to a method and apparatus for network virtualization and session management applied to a next-generation communication system.

2. Description of the Related Art

In order to meet the increasing demand for wireless data traffic after commercialization of 4G communication systems, efforts have been made to develop improved 5G or pre-5G communication systems. The 5G or pre-5G communication systems are also referred to as beyond 4G network communication systems or post LTE systems.

Implementation of a 5G communication system in an ultrahigh frequency (mmWave) band has been considered to achieve high data rates. Technologies such as beamforming, massive MIMO, full dimensional MIMO (FD-MIMO), array antennas, analog beamforming, and large scale antennas for the 5G communication system have been considered to mitigate a path loss of radio waves and to increase a transfer distance of the radio waves in the ultrahigh frequency band.

Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation.

In addition, in the 5G system, hybrid frequency-shift keying (FSK) and quadrature amplitude modulation (QAM), such as FQAM and sliding window superposition coding (SWSC), which correspond to advanced coding modulation (ACM) systems, as well as filter bank multicarrier (FBMC), non-orthogonal multiple access (NOMA), and sparse code multiple access (SCMA), which correspond to advanced connection technologies, have been developed.

On the other hand, in configuring a network slice, the standards for heightening flexibility through configuration of network function virtualization have been discussed. However, in case of such network function virtualization, it is required to perform an operation of a network realistically using a physical entity together, and there has been an increasing demand for effectively solving a control part that is unable to be solved by the operation discussed in the network function virtualization. In particular, since the current process is focused on the process for controlling the virtualization, or it corresponds to a control method in case where only a physical entity exists, there is a need for a process for effectively controlling and managing the same.

Furthermore, in a case of performing a handover of a protocol data unit (PDU) session, a terminal generates a data path for the PDU session toward a target access using a PDU session establishment procedure with respect to the target access, and erases a data path for the existing source access. However, since the terminal in a CM (connection management)-IDLE state should be switched to a CM-CONNECTED state through first performing of a service request or a registration request in order to perform the PDU session establishment procedure with respect to the target access, handover delay and signaling messages frequently occur. Further, if the terminal has not been registered with respect to the target access, it should perform the handover using the PDU session establishment procedure after first performing registration with respect to the target access, and thus the handover delay and signaling messages may frequently occur in the same manner.

Thus, there is a need for a process for effectively performing a handover of a PDU session with respect to the target access through a service request and registration request process.

SUMMARY

The present disclosure has been made to address at least the disadvantages described above and to provide at least the advantages described below.

Accordingly, an aspect of the present disclosure provides a processing method for a mapping procedure between a slice and an instance actually supporting the slice and a slice change. In 5G mobile communications, a network slice composed of a network resource capable of satisfying the requirements for each service is defined. A mobile communication service provider can define a specialized network slice for each service provider. A user sends a registration message including slice information intended to be used during a 5G network access.

An aspect of the present disclosure provides a method and apparatus for a terminal to perform a handover of a PDU session between a 3GPP access and a non-3GPP access in a 5G network, and for effectively performing the handover of the PDU session intended to be transferred in case where registration has not been made with respect to a target access or even in a CM-IDLE state although the registration has been made with respect to the target access.

In accordance with an aspect of the disclosure, there is provided a communication method of an access and mobility function (AMF) node in a communication system. The communication method includes receiving, from a base station, a registration request message for a terminal, transmitting, to an old AMF previously accessed by the terminal, an information request message for the terminal, and receiving, from the old AMF, an information response message including network slice selection assistance information (NSSAI) corresponding to the terminal.

In accordance with an aspect of the disclosure, there is provided a communication method of a terminal in a communication system. The method includes transmitting, to an access and mobility function (AMF), a registration request message, and receiving, from the AMF, a registration acceptance message corresponding to the registration request message. An information request message requesting information related to the terminal is transmitted from the AMF to an old AMF previously accessed by the terminal in accordance with the registration request message, and an information response message including network slice selection assistance information (NSSAI) corresponding to the terminal is transmitted from the old AMF to the AMF corresponding to the information request message.

In accordance with an aspect of the disclosure, there is provided an AMF node in a communication system. The AMF node includes a transceiver and a controller coupled with the transceiver. The controller is configured to receive, from a base station, a registration request message for a terminal, transmit, to an old AMF previously accessed by the terminal, an information request message for the terminal, and receive, from the old AMF, an information response message including network slice selection assistance information (NSSAI) corresponding to the terminal.

In accordance with an aspect of the disclosure, there is provided a terminal in a communication system. The terminal includes a transceiver and a controller coupled with the transceiver. The controller is configured to transmit, to an access and mobility function (AMF), a registration request message, and receive, from the AMF, a registration acceptance message corresponding to the registration request message. An information request message requesting information related to the terminal is transmitted from the AMF to an old AMF previously accessed by the terminal in accordance with the registration request message, and an information response message including network slice selection assistance information (NSSAI) corresponding to the terminal is transmitted from the old AMF to the AMF corresponding to the information request message.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 3D is a diagram of a handover process of a PDU session generated through a non-3GPP access to a 3GPP access using a service request and a PDU session establishment procedure in case where registration has been made with respect to the 3GPP access and the non-3GPP access, according to an embodiment;

FIG. 3F is a diagram of a handover process of a PDU session generated through a non-3GPP access to a 3GPP access using a registration process and a PDU session establishment procedure in case of a terminal of which registration has not been made with respect to the 3GPP access, according to an embodiment;

FIG. 3G is a diagram of a process of paging a terminal when DL data is generated with respect to a PDU session for a 3GPP access in case where the terminal of which registration has been made with respect to the 3GPP access and non-3GPP access is in a CM-IDLE state with respect to the 3GPP access and in a CM-CONNECTED state with respect to the non-3GPP access, according to an embodiment;

FIG. 4C is a diagram of a procedure in which a terminal re-requests a temporary rejected slice, according to an embodiment; and FIG. 4D is a diagram of a session correction procedure for identifying whether a slice has been changed, according to an embodiment.

DETAILED DESCRIPTION

Figure 1A:
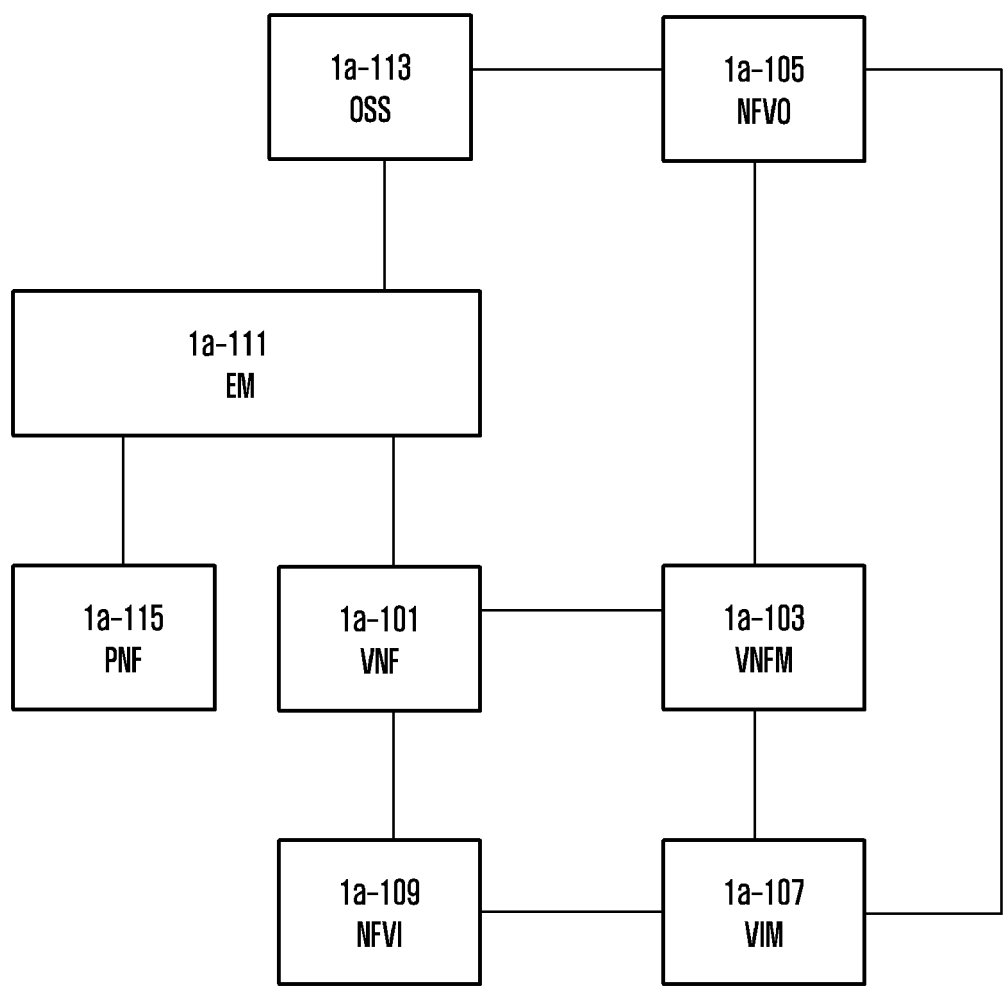
FIG. 1A is a diagram of an environment, according to an embodiment.

Embodiments of the disclosure will be described hereinbelow with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, glasses, contact lenses, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital versatile disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

Hereinafter, terms and titles that are defined in the 5G system standards are used in the present disclosure. However, the disclosure is not limited by the terms and titles, but can be equally applied to systems following other standards.

That is, although the communications standards organized by the 3GPP will be the main subject, the primary gist of the present disclosure can also be applied to other communication systems having similar technical backgrounds or channel types through slight modifications thereof in a range that does not greatly deviate from the scope of the disclosure by the judgment of those skilled in the art to which the disclosure pertains. Further, a non-3GPP access includes an access through WiFi, and may be equally applied with respect to other accesses excluding the access through 5G.

Further, slices, services, network slices, network services, application slices, and application services may be mixedly or interchangeably used.

FIG. 1A is a diagram of an environmental configuration, according to an embodiment.

Referring to FIG. 1A, a network functions virtualization orchestrator (NFVO) 1a-105, virtualized network function manager (VNFM) 1a-103, virtualized infrastructure management (VIM) 1a-107, network function virtualization infrastructure (NFVI) 1a-109, virtual network function (VNF) 1a-101, physical network function (PNF) 1a-115, element manager (EM) 1a-111, and operation support system (OSS) 1a-113 are configured. Although it is assumed that a communication network is a 5G network, the same concept may be applied to other systems in a category that can be understood by those of ordinary skill in the art. On the other hand, an environment in which a virtualized network is used in a 5G system is assumed. In case of such a virtualized network function, there may be a function called a virtualized network function management managing the virtualized network function and the NFVO to take charge of orchestration or overall control. Resources of such entities are virtually gathered and commonly called a network functions virtualization infrastructure (NFVI) 1a-109. Further, such resources are managed by the virtualized infrastructure manager (VIM) 1a-107.

Figure 1B:
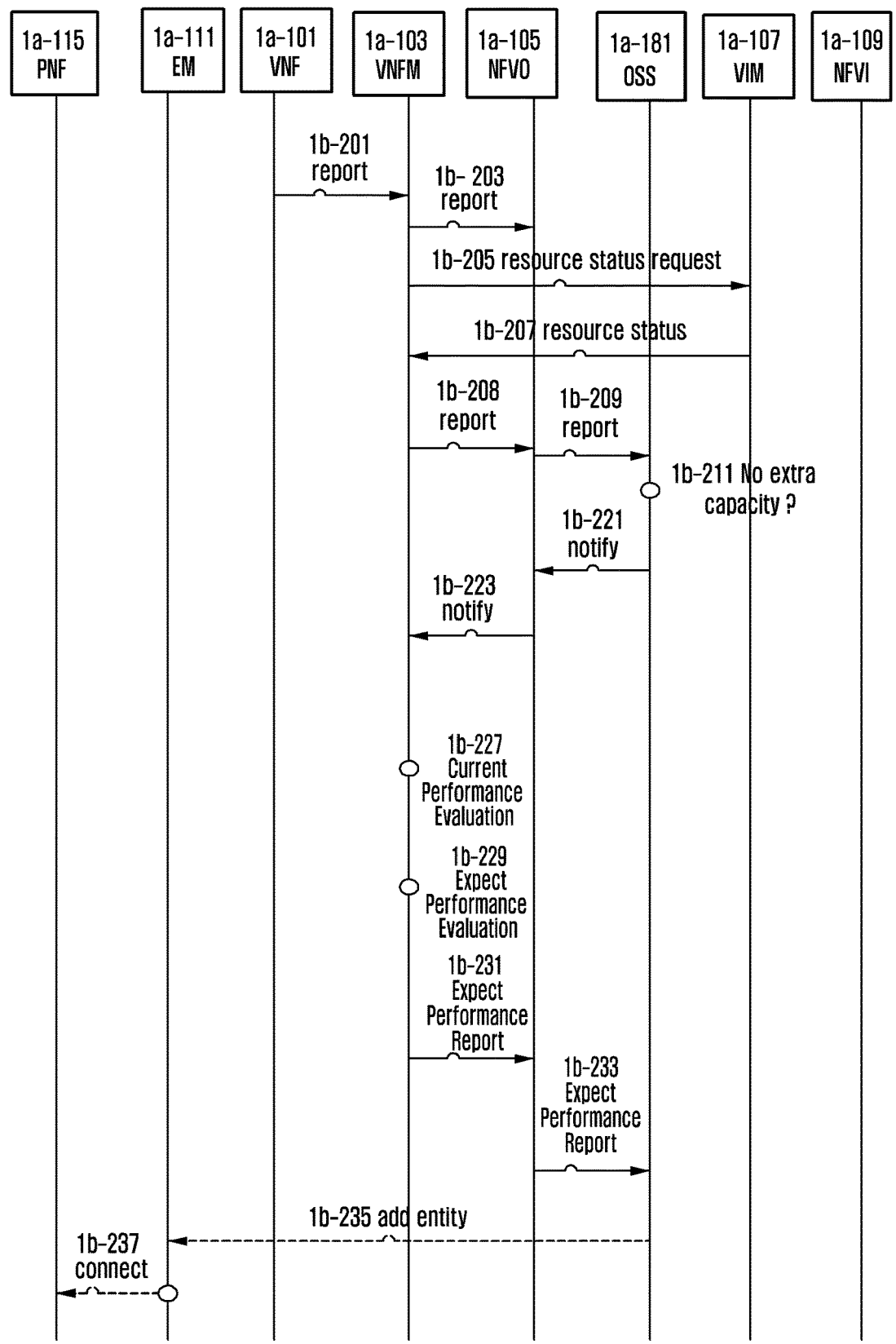
FIG. 1B is a diagram of a process to configure a network slice using network function virtualization and physical network entities, according to an embodiment.

FIG. 1B is a diagram of a process to configure a network slice using network function virtualization and physical network entities, according to an embodiment.

Referring to FIG. 1B, a network slice may be configured using VNF 1a-101 and PNF 1a-115. The network slice or the system may be configured to improve the performance through addition of the PNF 1a-115 in a state where the VNF 1a-101 has already been configured. Further, this process may also be used to separate a gNB using the PNF 1a-115 and to improve the performance in a situation where it is impossible to configure the network using only the VNF 1a-101, or in case where a next generation Node-B (gNB) (RAN) separately configures a central unit (CU) and a distributed unit (DU).

At step 1b-201, the VNF 1a-101 reports the performance of a network entity to the VNFM 1a-103.

At step 1b-203, the VNFM 1a-103 reports the performance of the network entity to the NFVO 1a-105.

At step 1b-205, the VNFM 1a-103 request a resource status of the VNF 1a-101 from the VIM 1a-107.

At step 1b-207, the VIM 1a-107 reports the resource status to the VNFM 1a-103.

At step 1b-208, the VNFM 1a-103 reports the status of the VNF 1a-101 to the NFVO 1a-105.

At step 1b-209, the NFVO 1a-105 reports the VNF 1a-101 to the OSS 1a-181. Through this process, the OSS 1a-181 can acquire information on the overall system operation.

At step 1b-211, the OSS 1a-181 determines whether an extra capacity for supporting an additional performance exists in the network in view of the performance of the VNF 1a-101 even if the PNF 1a-115 is not supported.

At step 1b-221, the OSS 1a-181 controls the NFVO 1a-105 to notify the VNFM 1a-103 of evaluation of the current performance of the VNF.

At step 1b-223, the NFVO 1a-105 notifies the VNFM 1a-103 of evaluation of the current performance of the VNF 1a-101.

At step 1b-227, the VNFM 1a-103 performs performance evaluation with respect to the current status of the VNF 1a-101. Through such current performance evaluation, a communication success rate and average throughput are evaluated.

At step 1b-229, if the PNF 1a-115 is added based on the current status of the VNF 1a-101, or if another VNF 1a-101 is added, the VNFM 1a-103 evaluates the expected performance. In this case, latency, bandwidth, capacity, and coverage may be used.

At step 1b-231, if the PNF 1a-115 is added, the VNFM 1a-103 reports the expected evaluated performance to the NFVO 1a-105.

At step 1b-233, the NFVO 1a-105 reports the expected evaluated performance to the OSS 1a-181.

At step 1b-235, if the PNF 1a-115 is added to the EM, the OSS 1a-181 notifies the EM of the expected capacity of the PNF 1a-115 based on the expected performance. The expected capacity required in the PNF 1a-115 and the performance improvement of the overall system due to the capacity are notified.

At step 1b-237, the PNF 1a-115 is added on based on the EM, and the EM interlocks with the PNF 1a-115.

Figure 1C:
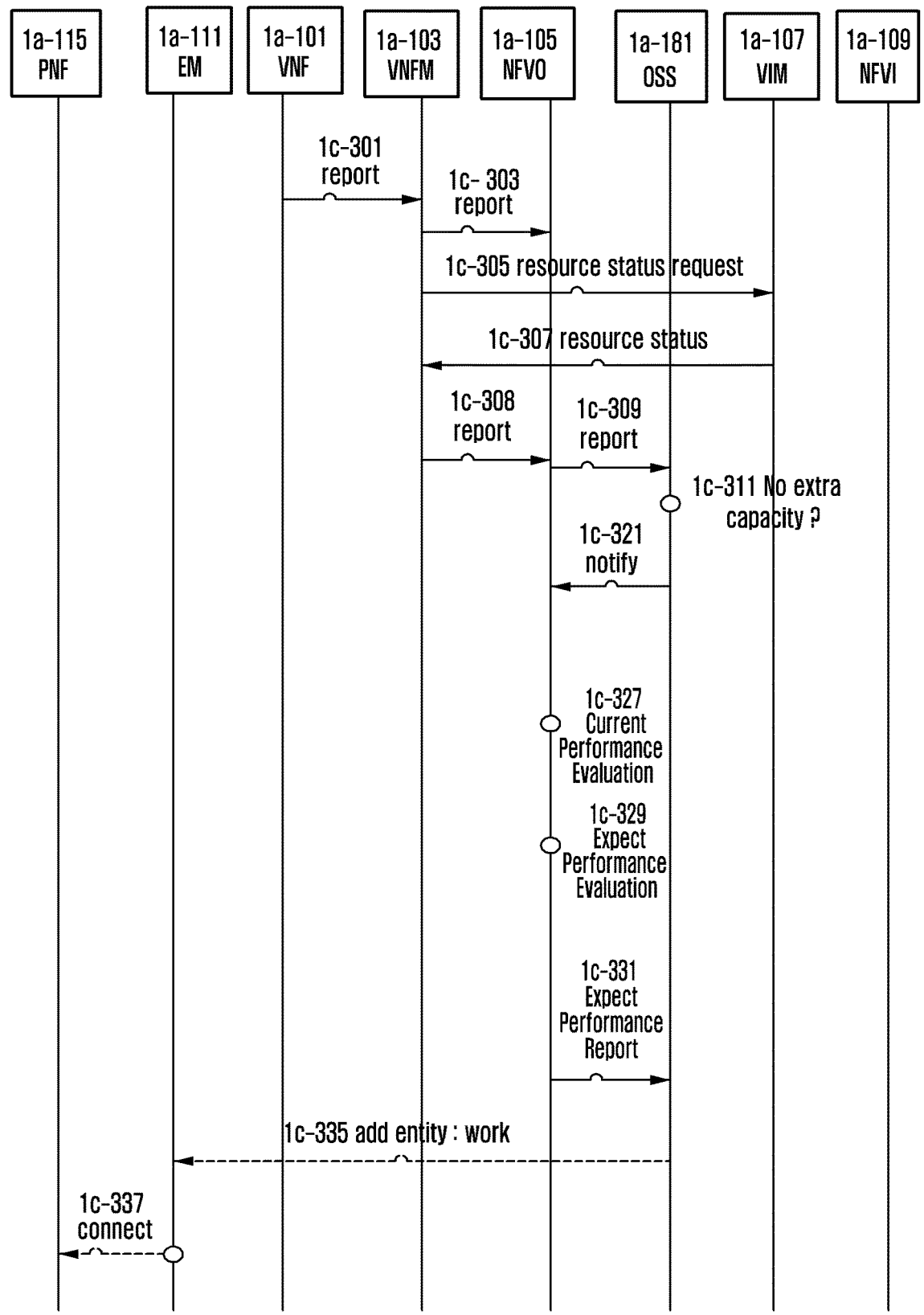
FIG. 1C is a diagram of a management process during configuration of a network slice using network function virtualization, according to an embodiment.

FIG. 1C is a diagram of a management process during configuration of a network slice using network function virtualization, according to an embodiment.

Referring to FIG. 1C, the network slice is configured using the VNF 1a-101 and the PNF 1a-115. The network slice or the system may be configured to improve the performance through addition of the PNF 1a-115 in a state where the VNF 1a-101 has already been configured. Further, this process may also be used to separate the gNB using the PNF 1a-115 and to improve the performance in a situation where it is impossible to configure the network using only the VNF 1a-101, or when the next gNB RAN separately configures the CU and the DU.

At step 1c-301, the VNF 1a-101 reports the performance of a network entity to the VNFM 1a-103.

At step 1c-303, the VNFM 1a-103 reports the performance of the network entity to the NFVO 1a-105.

At step 1c-305, the VNFM 1a-103 request a resource status of the VNF 1a-101 from the VIM 1a-107.

At step 1c-307, the VIM 1a-107 reports the resource status to the VNFM 1a-103.

At step 1c-308, the VNFM 1a-103 reports the status of the VNF 1a-101 to the NFVO 1a-105.

At step 1c-309, the NFVO 1a-105 reports the VNF 1a-101 to the OSS 1a-181. Through this process, the OSS 1a-181 can acquire information on the overall system operation.

At step 1c-311, the OSS 1a-181 determines whether an extra capacity for supporting an additional performance exists in the network in view of the performance of the VNF 1a-101 even if the PNF 1a-115 is not supported.

At step 1c-321, the OSS 1a-181 controls the NFVO 1a-105 to notify the VNFM 1a-103 of evaluation of the current performance of the VNF 1a-101.

At step 1c-327, the NFVO 1a-105 performs performance evaluation with respect to the current status of the VNF 1a-101. Through such current performance evaluation, a communication success rate and average throughput are evaluated.

At step 1c-329, if the PNF 1a-115 is added based on the current status of the VNF 1a-101, or if another VNF 1a-101 is added, the NFVO 1a-105 evaluates the expected performance. In this case, latency, bandwidth, capacity, and coverage may be used.

At step 1c-333, the NFVO 1a-105 reports the expected evaluated performance to the OSS 1a-181.

At step 1c-335, if the PNF 1a-115 is added to the EM, the OSS 1a0181 notifies the EM of the expected capacity of the PNF 1a-115 based on the expected performance. The expected capacity required in the PNF 1a-115 and the performance improvement of the overall system due to the capacity is notified.

At step 1c-337, the PNF 1a-115 is added on based on the EM, and the EM interlocks with the PNF 1a-115.

Figure 1D:
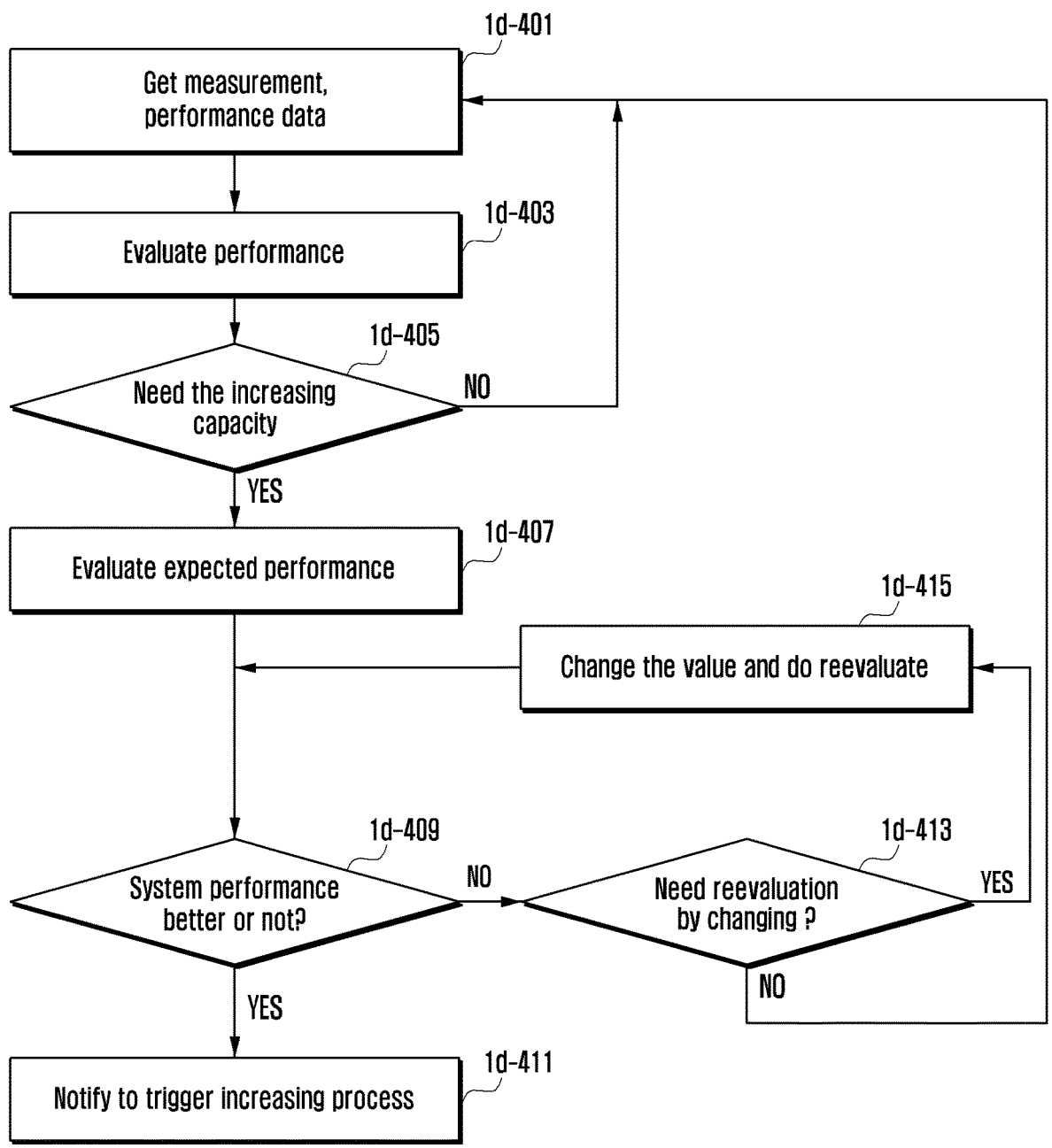
FIG. 1D is a diagram of a process to analyze, predict, and manage the performance, according to an embodiment.

FIG. 1D is a diagram of a process to analyze, predict, and manage the performance, according to an embodiment.

At step 1d-401, system performance data or measurement data is obtained.

At step 1d-403, the current system performance is evaluated.

At step 1d-405, it is determined whether it is necessary to increase the system capacity or other performance parameters in view of the current system performance.

At step 1d-407, the performance expected when the PNF or VNF is added to improve the system capacity or other parameters is evaluated.

At step 1d-409, it is determined whether the expected system performance is improved.

At step 1d-411, if the performance improvement is expected, it is notified to execute a process for improving the performance through addition of the PNF or VNF.

At step 1d-413, it is determined whether it is necessary to reevaluate the expected performance through correction of expected parameters. If it is not necessary, step 1d-401 to obtain performance data is performed.

At step 1d-415, whether the system performance is improved is determined (1d-409) after the performance parameter is changed and reevaluated.

Figure 2A:
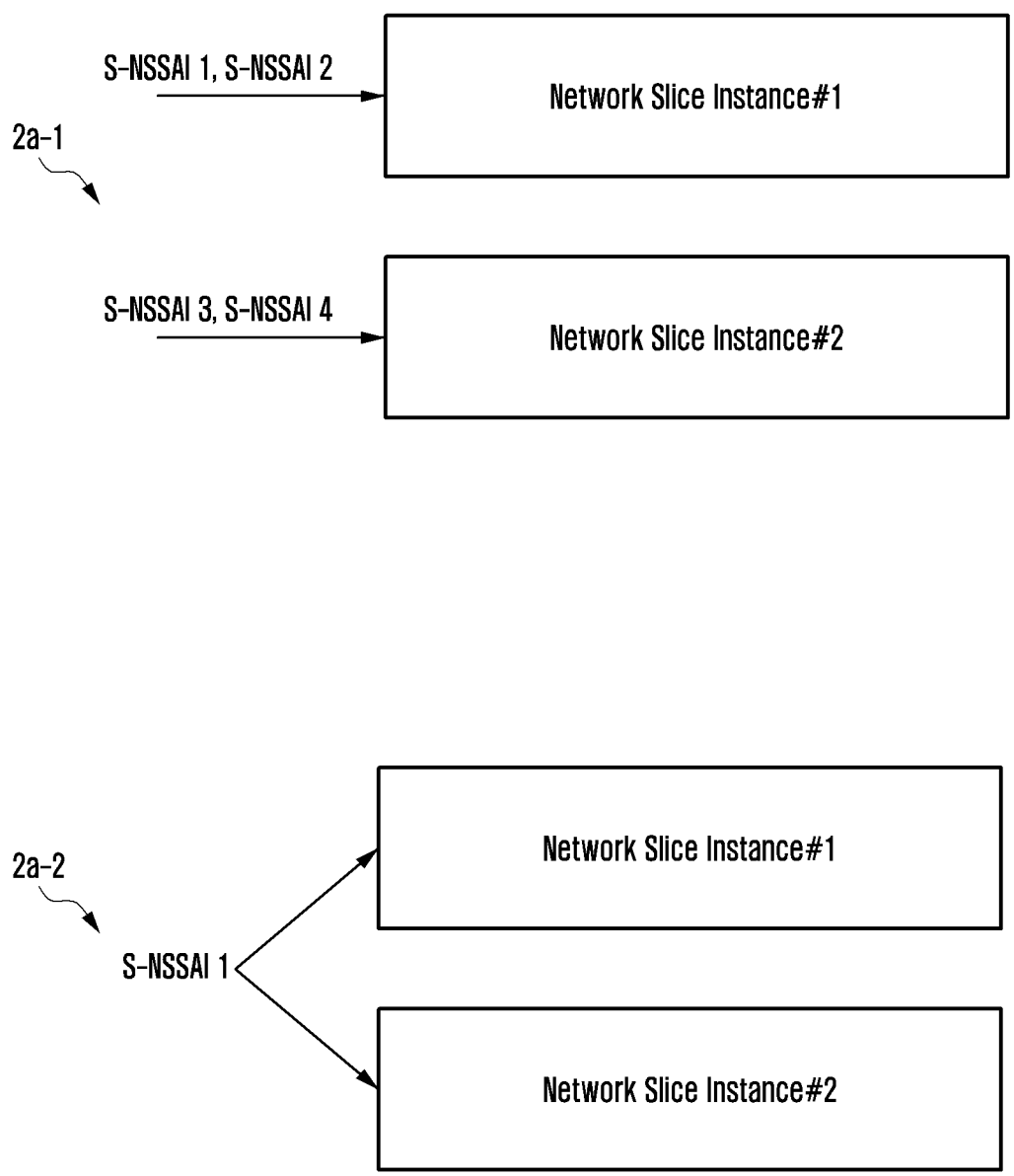
FIG. 2A is a diagram of a relationship between S-NSSAI and NSI, according to an embodiment.

FIG. 2A is a diagram of a relationship between single network slice assistance information (S-NSSAI) and NSI ID, according to an embodiment.

Referring to FIG. 2A, the relationship between the S-NSSAI and the NSI ID is described. In a 5G network, a slice is described as S-NSSAI. The actual instance of NFs providing the S-NSSAI is described as a network slice instance (NSI). The NSI has an ID, and this ID is called an NSI ID. One NSI may be mapped to several S-NSSAIs (2a-1), or one S-NSSAI may be mapped to several NSIs (2a-2).

Figure 2B:
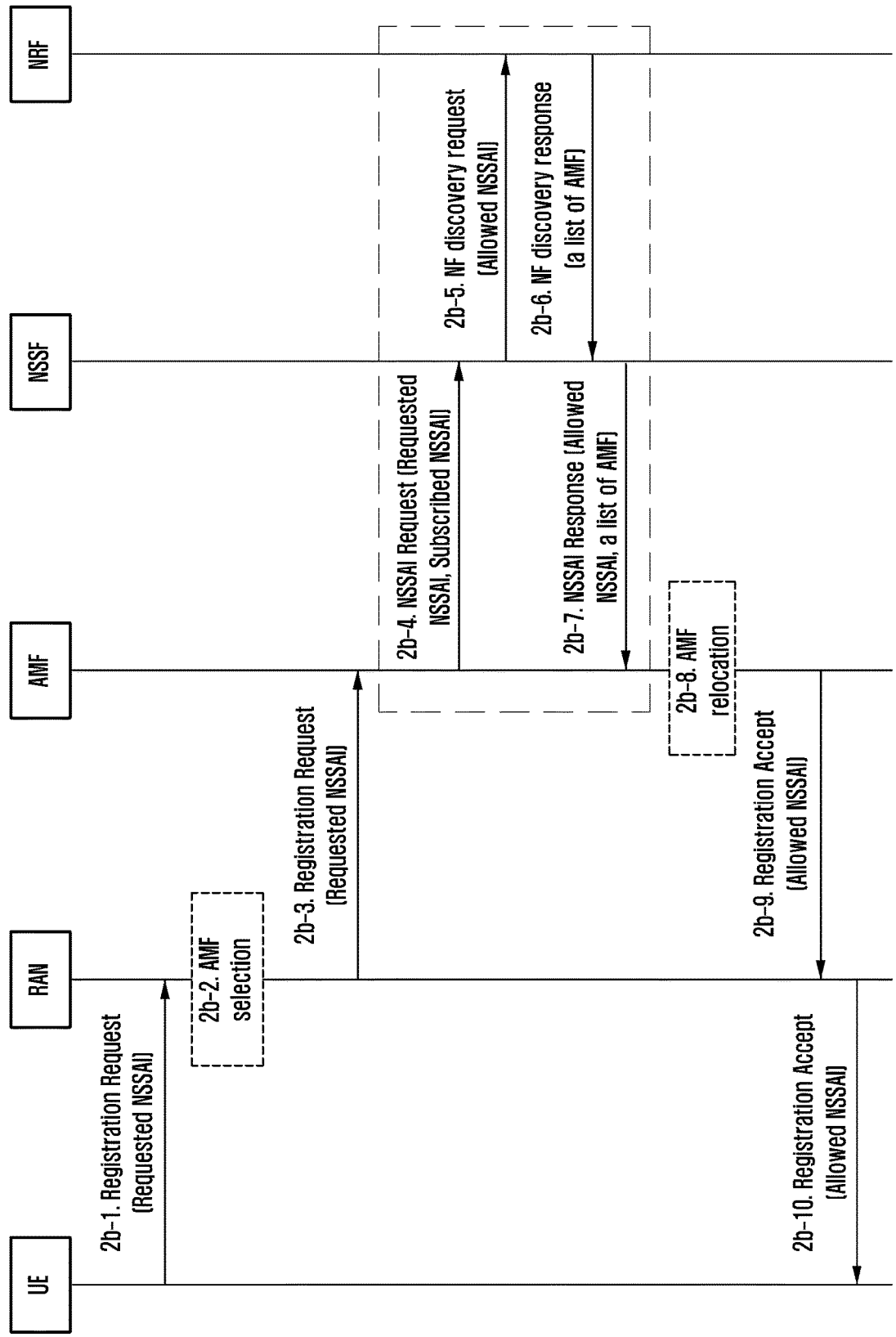
FIG. 2B is a diagram of a procedure of determining allowed NSSAI during a registration process and determining AMF supporting the corresponding allowed NSSAI, according to an embodiment.

FIG. 2B is a diagram of a procedure of determining allowed NSSAI during a registration process and determining AMF supporting the corresponding allowed NSSAI, according to an embodiment.

Referring to FIG. 2B, at step 2b-1, the terminal includes slice information S-NSSAIs intended to be used to access the network in a requested NSSAI to be transferred to the AMF (2b-2 and 2b-3).

The AMF sends an NSSAI request message to the network slice selection function (NSSF) at step 2b-4. The NSSAI request message may include the requested NSSAI (list of S-NSSAIs requested by the terminal) transferred from the terminal at steps 2b-1 and 2b-3 and a subscribed NSSAI (list of S-NSSAIs in which the terminal has subscribed) of the terminal that the AMF has acquired from the UDM.

At step 2b-5, the NSSF that has determined the allowed NSSAI (list of S-NSSAIs that can be used by the terminal to access the network) requests AMF information capable of providing the corresponding allowed NSSAI from the NRF. The allowed NSSAI may be included in message of step 2b-5.

The NRF replies the AMF capable of providing the allowed NSSAI or an AMF list to the NSSF at step 2b-6.

At step 2b-7, the NSSF includes and sends to the AMF the allowed NSSAI and the AMF information (AMF or AMF list or AMF IP address and fully qualified domain name (FQDN) of the AMF). At step 2b-8, AMF relocation may occur in view of the AMF information included at step 2b-7.

At steps 2b-9 and 2b-10, the AMF sends to the terminal a registration accept message including the allowed NSSAI that is a list of S-NSSAIs that can be used by the terminal to access the network.

Figure 2C:
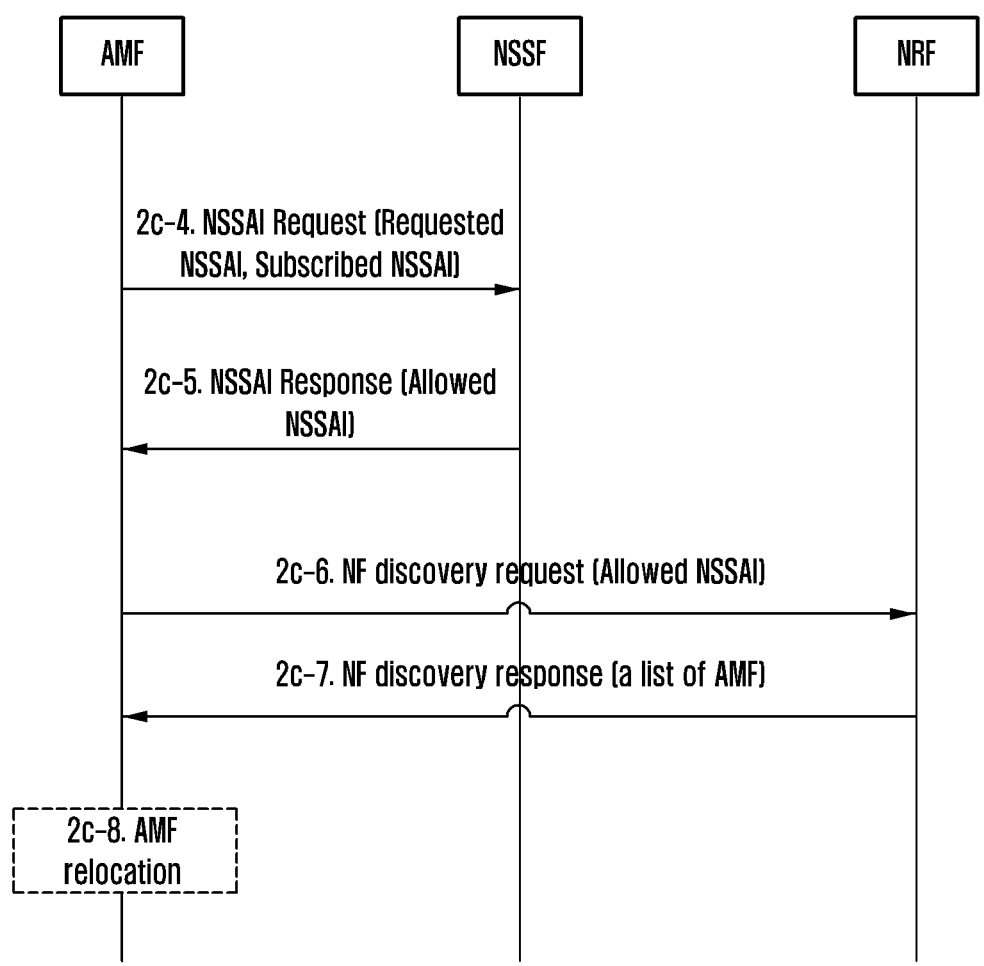
FIG. 2C is a diagram of a second method for a procedure of determining allowed NSSAI during a registration process and determining AMF supporting the corresponding allowed NSSAI, according to an embodiment.

FIG. 2C is a diagram of a second method for a procedure of determining allowed NSSAI during a registration process and determining AMF supporting the corresponding allowed NSSAI, according to an embodiment.

Referring to FIG. 2C, the NSSF that has received the NSSAI request at step 2c-4 determines the allowed NSSAI and sends the allowed SSSAI to the AMF at step 2c-5.

The AMF that has received the allowed NSSAI sends an NF discovery request to the NRF at step 2c-6. The request may include the allowed NSSAI. The NRF may discover the AMF providing the corresponding allowed NSSAI and may send the AMF information at step 2c-7.

Figure 2D:
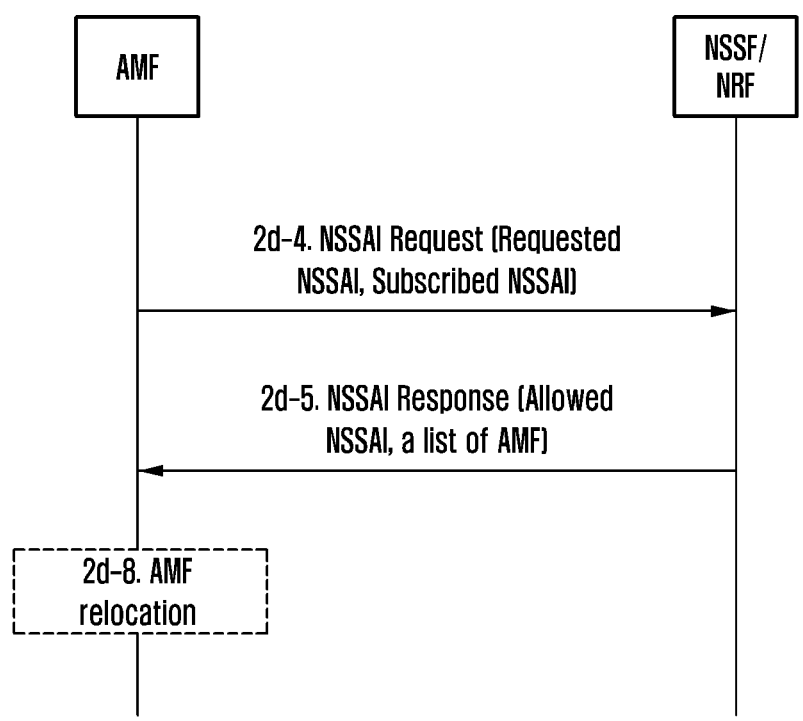
FIG. 2D is a diagram of a third method for a procedure of determining allowed NSSAI during a registration process and determining AMF supporting the corresponding allowed NSSAI according to an embodiment.

FIG. 2D is a diagram of a third method for a procedure of determining allowed NSSAI during a registration process and determining AMF supporting the corresponding allowed NSSAI according to an embodiment.

Referring to FIG. 2D, if the AMF sends the NSSAI request message at step 2d-4, the NSSF/NRF sends the allowed NSSAI and the AMF information capable of supporting the corresponding allowed NSSAI to the AMF at step 2d-5.

Figure 2E:
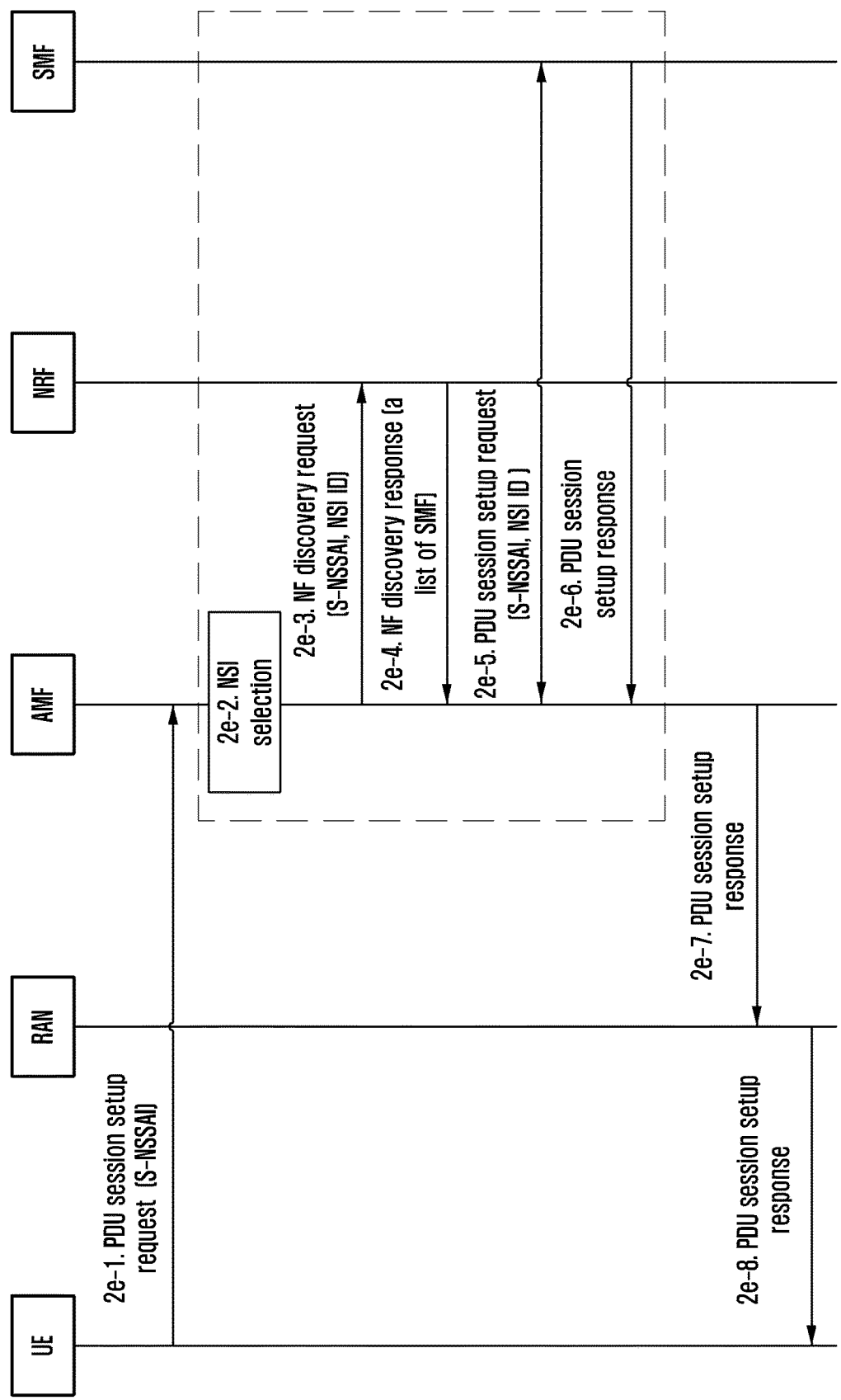
FIG. 2E is a diagram of a procedure of selecting and mapping a network slice information (NSI) ID supporting S-NSSAI during a PDU session setup process, according to an embodiment.

FIG. 2E is a diagram of a procedure of selecting and mapping a network slice information (NSI) ID supporting S-NSSAI during a PDU session setup process, according to an embodiment.

Referring to FIG. 2E, at step 2e-1, the terminal transmits a PDU session setup request. One of the S-NSSAIs included in the allowed NSSAI received at step 2b-10 of FIG. 2B may be selected and included in the PDU session setup request. At step 2e-2, the AMF selects an NSI ID capable of supporting the requested S-NSSAI. Thereafter, at step 2e-3, the AMF sends an NF discovery request to the NRF to discover the session management function (SMF) capable of supporting the corresponding S-NSSAI or the NSI ID. The NF discovery request may include both the S-NSSAI and the NSI ID, or may include only the NSI ID. The requested NRF discovers the SMF providing the corresponding slice, and sends the SMF information to the AMF at step 2e-4. The AMF selects one SMF based on information received from the NRF and sends the PDU session setup request message at step 2e-5. The NSI ID may be included in the PDU session setup request.

Figure 2F:
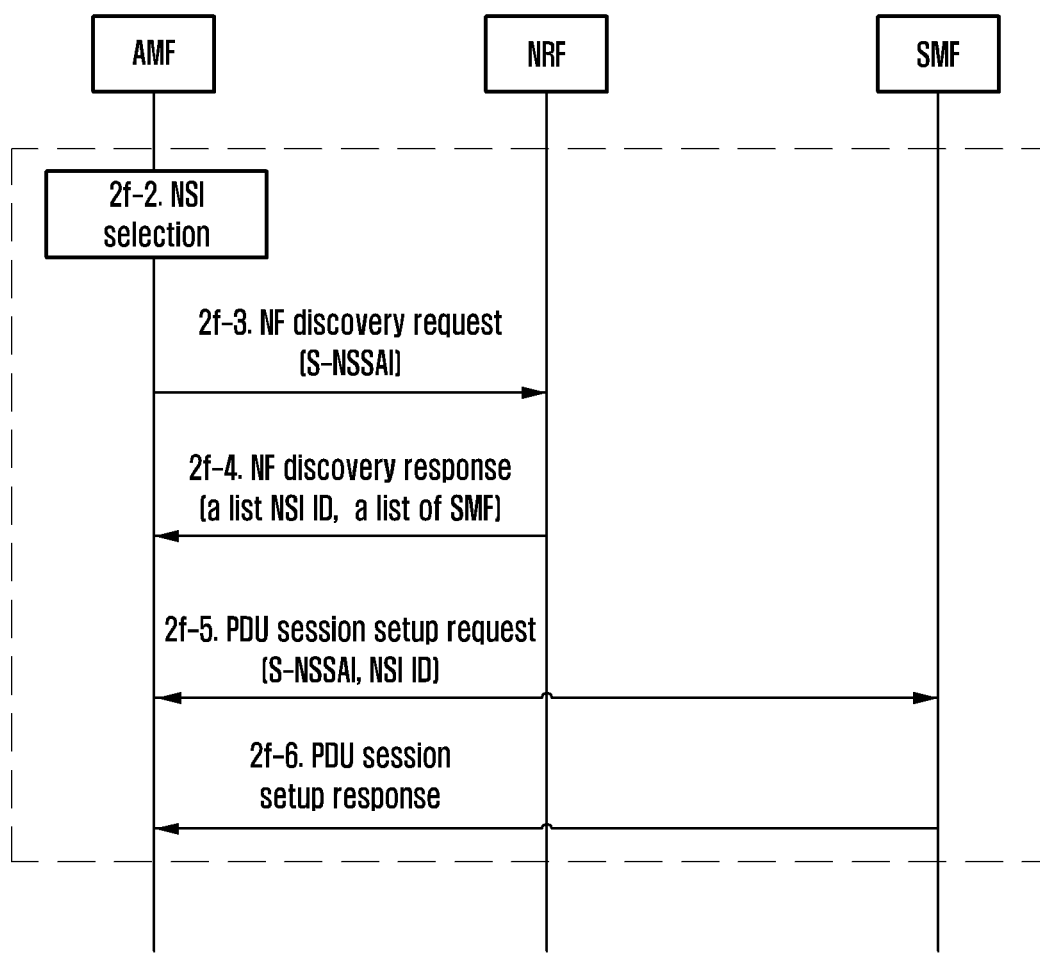
FIG. 2F is a diagram of a second method for a procedure of selecting and mapping an NSI ID supporting S-NSSAI during a PDU session setup process, according to an embodiment.

FIG. 2F is a diagram of a second method for a procedure of selecting and mapping an NSI ID supporting S-NSSAI during a PDU session setup process, according to an embodiment.

Referring to FIG. 2F, at step 2*f*-2, the NRF may select and give the corresponding information to the AMF rather than the AMF selects the NSI ID. At step 2*f*-3, the AMF sends the NF discovery request including the S-NSSAI requested from the terminal to the NRF. The NRF can support the corresponding S-NSSAI, and transfers information on the NSI ID to which the AMF currently belongs and SMF information to the AMF at step 2*f*-4. The NSI ID information may be one NSI ID or a plurality of NSI IDs. The SMF information may be SMF IP addresses, SMF FQDN, and SMF IDs of one or a plurality of SMFs. If a plurality of NSI ID information and SMF information at step 2*f*-4, the AMF selects them one by one, and send a PDU session setup request message to the SMF at steps 2*f*-5 and 2*f*-6.

Figure 3A:
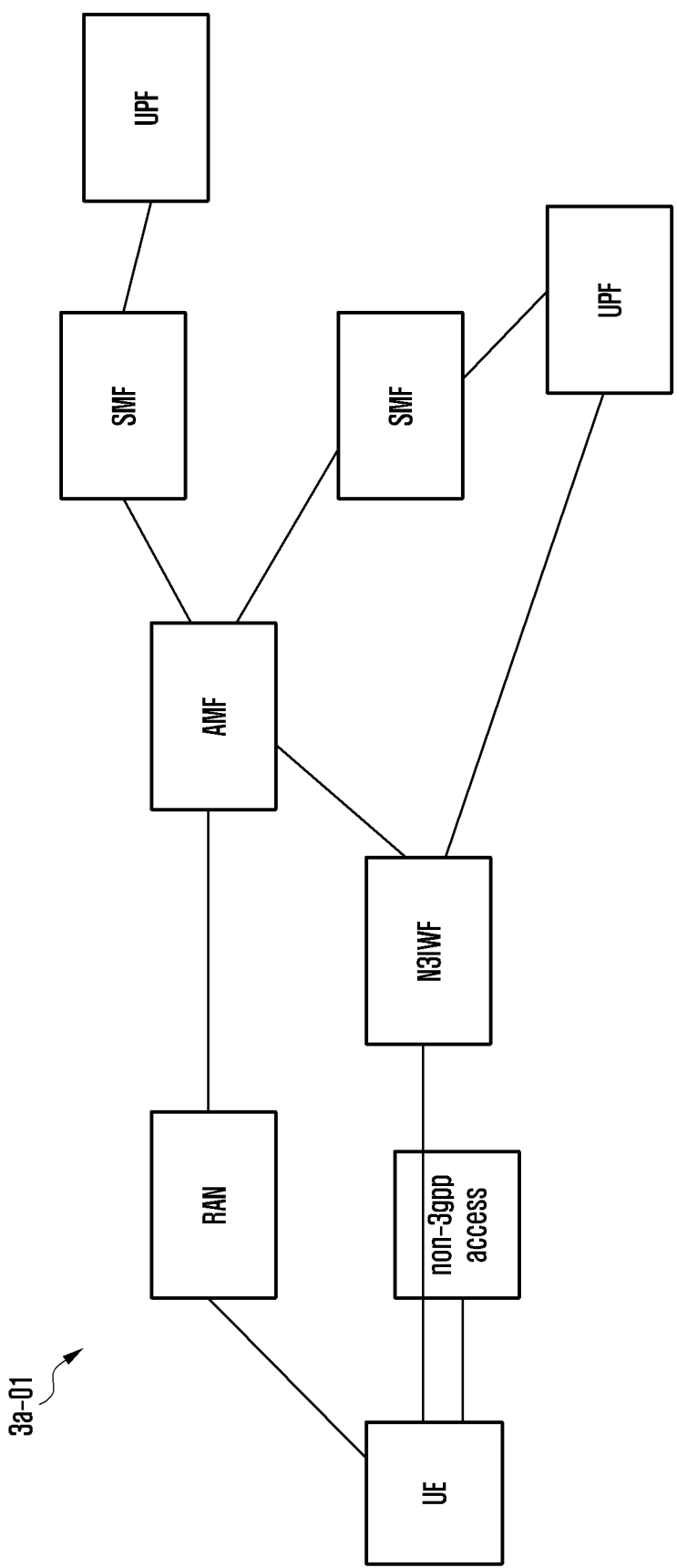
FIG. 3A is a diagram of a structure in which a terminal accesses a 5G network through a 3GPP access and a non-3GPP access, according to an embodiment.

FIG. 3A is a diagram of a structure in which a terminal accesses a 5G network through a 3GPP access and a non-3GPP access, according to an embodiment.

Referring to FIG. 3A, FIG. 3A illustrates an example of a structure (3*a*-01) in which a terminal accesses a 5G network through a non-3GPP access. FIG. 3A also illustrates a structure in which the terminal uses a common AMF by performing an access through a 3GPP access and a non-3GPP access.

If a terminal accesses a 5G core network through a 3GPP access (i.e., a 5G RAN), and simultaneously accesses the 5G core network through a non-3GPP access, a common AMF is selected. The terminal accesses the 5G core network through the 3GPP access and the non-3GPP access, and the AMF separately performs registration management with respect to a 3GPP and a non-3GPP.

An non-3GPP interworking function (N3IWF) is 5G core network equipment defined for smooth interlocking between the non-3GPP access and the 5G core network, and is an entity that serves to forward a non-access stratum (NAS) message or data transmitted/received through the non-3GPP access. The N3IWF may also be referred to as new generation packet data gateway (ngPDG). An SMF is an entity serving to forward user data under the control of the SMF.

Handover delay and the number of signaling messages may be reduced by switching a PDU session to a target access together with a service request and registration request process in accordance with a target access situation in a process of performing a handover of the PDU session between the 3GPP access and the non-3GPP access in accordance with the situation with respect to PDU sessions generated by the terminal.

Figure 3B:
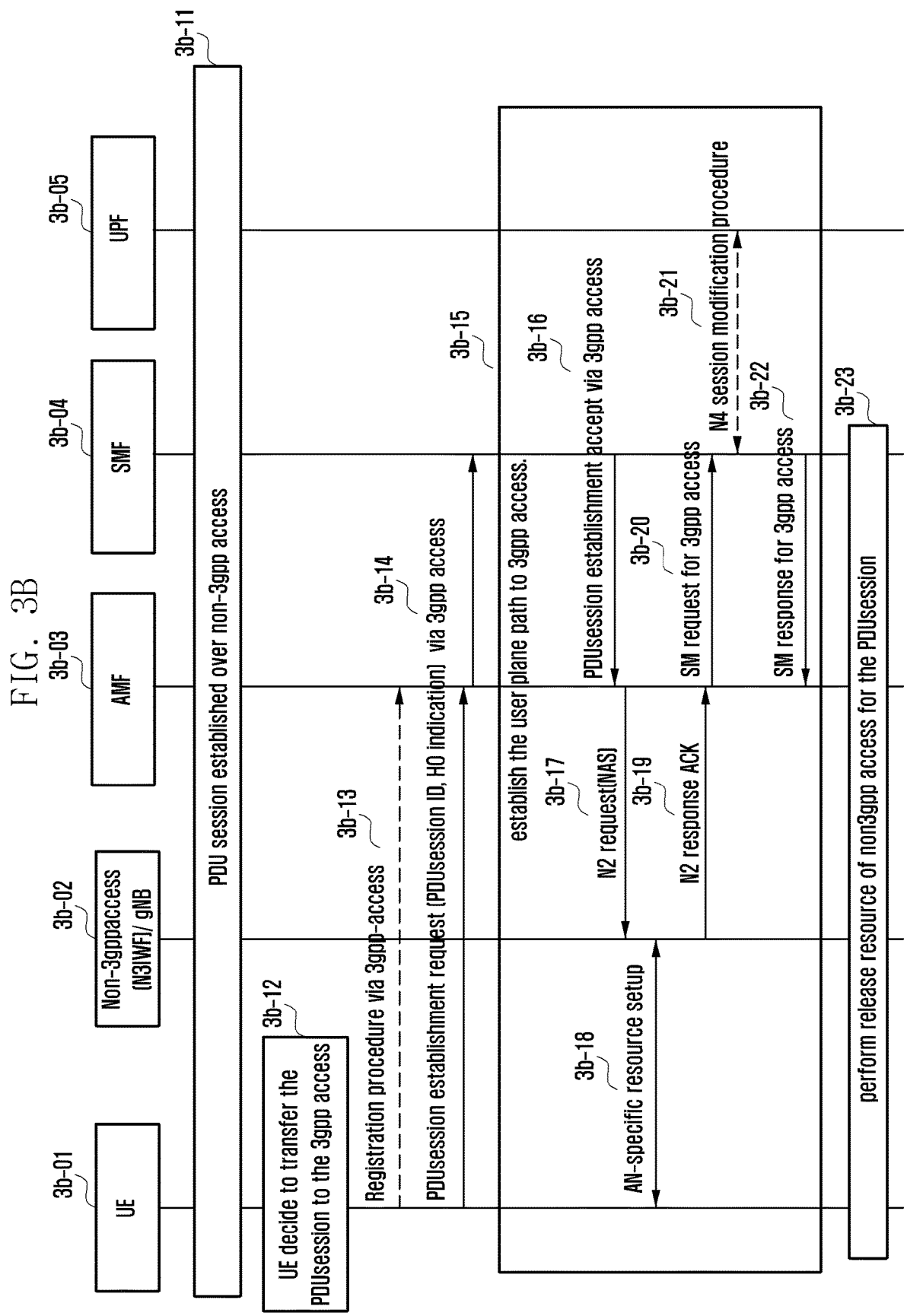
FIG. 3B is a diagram of a handover process of a PDU session generated through a non-3GPP access to a 3GPP access, according to an embodiment.

FIG. 3B is a diagram of a handover process of a PDU session generated through a non-3GPP access to a 3GPP access, according to an embodiment.

Referring to FIG. 3B, a terminal 3*b*-01 that has been successfully registered in the 5G network through the non-3GPP access uses the PDU session generated through the non-3GPP access (3*b*-11).

If the terminal determines to perform a handover of the PDU session to the 3GPP access (3*b*-12), the terminal first performs registration if the registration has not been made with respect to the 3GPP access (3*b*-13). The handover is performed only in case where the same AMF manages the registration with respect to the 3GPP access and the non-3GPP access.

On the other hand, the terminal that has been registered with respect to the 3GPP access sends a PDU session establishment request message to the SMF through the AMF with respect to the 3GPP access. The PDU session establishment request message includes a PDU session ID of the PDU session intended to perform the handover, and includes a handover (HO) indication for notifying the handover of the PDU session from the non-3GPP access to the 3GPP access (3*b*-14).

The SMF having received the PDU session establishment request switches a data path toward the 3GPP access side with respect to the corresponding PDU session (3*b*-15). Further, a procedure for releasing resources for the non-3GPP access is performed to complete the handover (3*b*-23).

The process (3*b*-15) for the SMF to switch the data path toward the 3GPP access side with respect to the corresponding PDU session is performed through processes (3*b*-16 to 3*b*-22).

If the SMF sends the PDU session establishment accept message to the AMF through the 3GPP access (3*b*-16), the AMF carries the PDU session establishment accept on an N2 request message to be sent to the gNB, and the gNB sets up the resource with the terminal (3*b*-18). The gNB transfers a corresponding ACK to the AMF through 3*b*-19, sends an session management (SM) request to the SMF, and transfers related information to the User plane function (UPF) through an N4 session modification process to switch the data path to the 3GPP access (3*b*-20, 3*b*-21, and 3*b*-22).

Figure 3C:
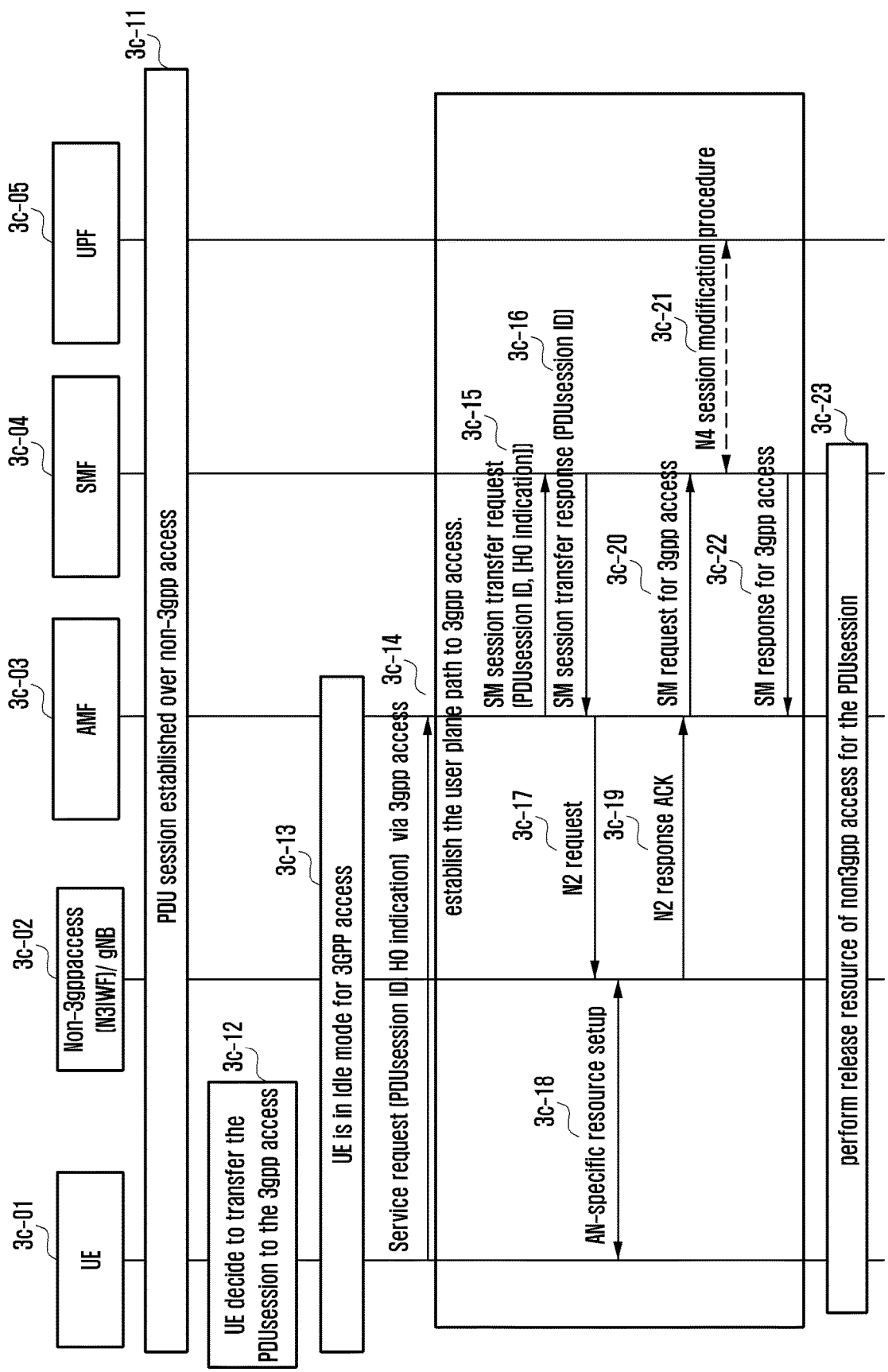
FIG. 3C is a diagram of a handover process of a PDU session generated through a non-3GPP access to a 3GPP access using a service request in case where registration has been made with respect to the 3GPP access and the non-3GPP access, according to an embodiment.

FIG. 3C is a diagram of a handover process of a PDU session generated through a non-3GPP access to a 3GPP access using a service request in case where registration has been made with respect to the 3GPP access and the non-3GPP access, according to an embodiment.

Referring to FIG. 3C, a terminal 3*c*-01 that has been successfully registered in the 5G network through the non-3GPP access uses the PDU session generated through the non-3GPP access (3*c*-11).

If the terminal determines to perform a handover of the PDU session to the 3GPP access (3*c*-12), in case of CM-IDLE with respect to the 3GPP access (3*c*-13), the terminal performs a service request. The service request message includes a PDU session ID of the PDU session intended to perform the handover, and may also include a HO indication for notifying the handover of the PDU session from the non-3GPP access to the 3GPP access (3*c*-14).

The AMF having received the service request sends a message for requesting PDU session transfer to the SMF managing the corresponding PDU session (3*c*-15). The session transfer request message includes a PDU session ID of the PDU session intended to perform the handover, and may also include a HO indication for notifying the handover of the PDU session from the non-3GPP access to the 3GPP access. In response to this, the SMF sends a session transfer response to the AMF so as to switch a data path toward the 3GPP access side with respect to the corresponding PDU session (3*c*-16). Accordingly, the AMF makes the gNB set up the resource with the terminal using N2 request message (3*c*-17), and the gNB sets up the resource with the terminal (3*c*-18). The gNB transfers a corresponding ACK to the AMF through 3*c*-19, sends an SM request to the SMF, and transfers related information to the UPF through an N4 session modification process to switch the data path through the 3GPP access (3*c*-20, 3*c*-21, and 3*c*-22).

Further, the gNB performs a procedure of releasing the resource with respect to the non-3GPP access to complete the handover (3*c*-23).

FIG. 3D is a diagram of a handover process of a PDU session generated through a non-3GPP access to a 3GPP access using a service request and a PDU session establishment procedure in case where registration has been made with respect to the 3GPP access and the non-3GPP access, according to an embodiment.

Referring to FIG. 3D, a terminal 3d-01 that has been successfully registered in the 5G network through the non-3GPP access uses the PDU session generated through the non-3GPP access (3d-11).

If the terminal determines to perform a handover of the PDU session through the 3GPP access (3d-12), the terminal generates a PDU session establishment request message. The PDU session establishment request message includes a PDU session ID of the PDU session intended to perform the handover, and may also include an HO indication for notifying the handover of the PDU session from the non-3GPP access to the 3GPP access.

However, if the terminal is in a CM-IDLE state with respect to the 3GPP access (3d-13), the terminal performs a service request, and the service request performs piggyback of the generated PDU session establishment request message. The service request includes a container for transferring a NAS message, for example, an SM NAS container, and puts the PDU session establishment request message in the SM NAS container to transfer the message to the AMF (3d-14).

The AMF having received the service request recovers and sends the PDU session establishment request message to the SMF managing the corresponding PDU session ID (3d-15).

The SMF having received the PDU session establishment request switches a data path toward the 3GPP access side with respect to the corresponding PDU session. Further, the SMF performs a procedure of releasing the resource with respect to the non-3GPP access to complete the handover (3d-23).

The process in which the SMF switches the data path toward the 3GPP access side with respect to the corresponding PDU session is performed through processes 3d-16 to 3d-22.

If the SMF sends a PDU session establishment accept message to the AMF through the 3GPP access (3d-16), the AMF carries the PDU session establishment accept on an N2 request message to be sent to the gNB, and the gNB sets up the resource with the terminal (3d-18). The gNB transfers a corresponding ACK to the AMF through 3d-19, sends an SM request to the SMF, and transfers related information to the UPF through an N4 session modification process to switch the data path to the 3GPP access (3d-20, 3d-21, and 3d-22).

Figure 3E:
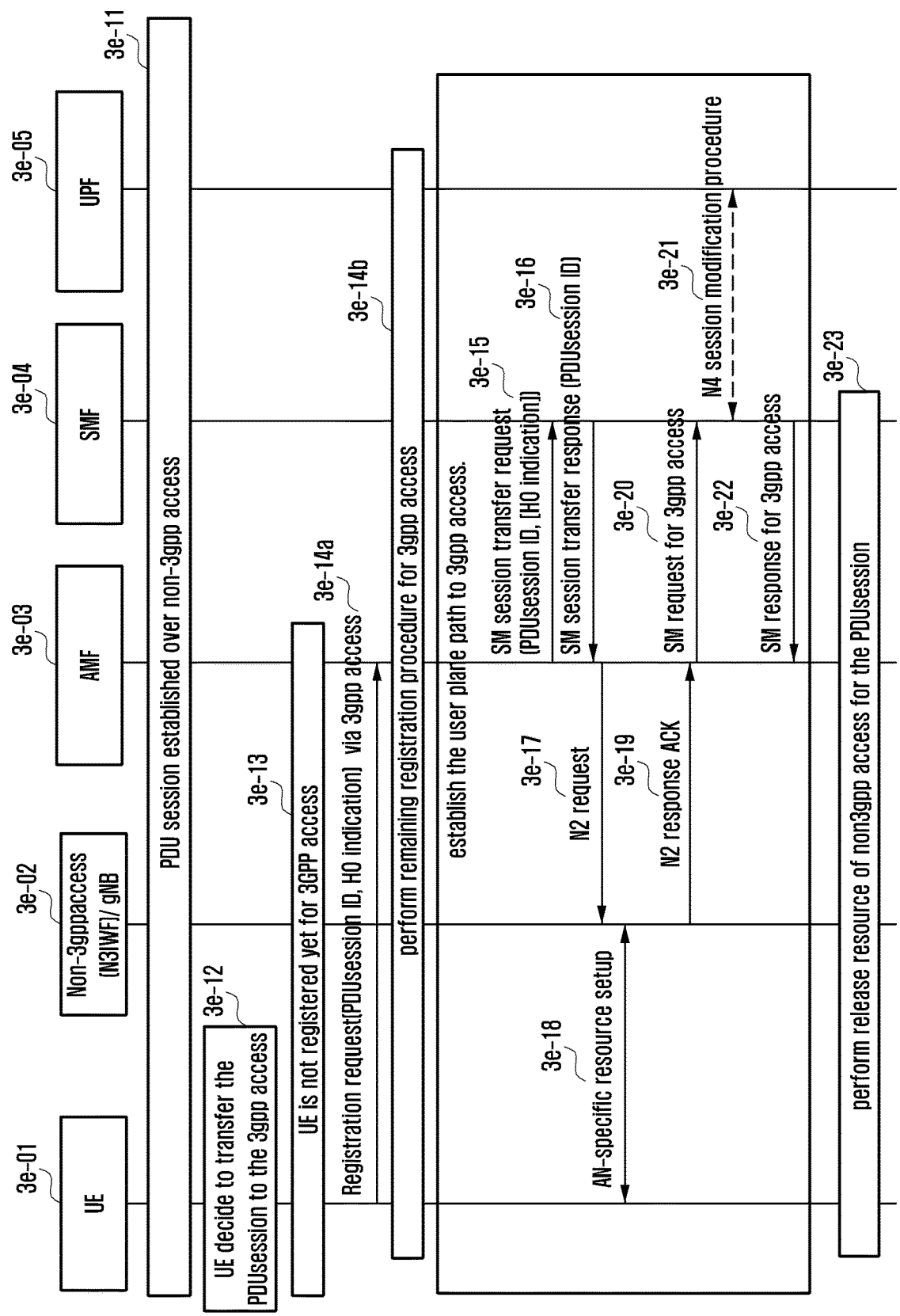
FIG. 3E is a diagram of a handover process of a PDU session generated through a non-3GPP access to a 3GPP access using a registration process in case of a terminal of which registration has not been made with respect to the 3GPP access, according to an embodiment.

FIG. 3E is a diagram of a handover process of a PDU session generated through a non-3GPP access to a 3GPP access using a registration process in case of a terminal of which registration has not been made with respect to the 3GPP access, according to an embodiment.

Referring to FIG. 3E, a terminal 3e-01 that has been successfully registered in the 5G network through the non-3GPP access uses the PDU session generated through the non-3GPP access (3e-11).

If the terminal determines to perform a handover of the PDU session to the 3GPP access (3e-12), where the registration has not been made with respect to the 3GPP access (3e-13), the terminal performs registration with respect to the 3GPP access. The registration request message includes a PDU session ID of the PDU session intended to perform the handover, and may also include a HO indication for notifying the handover of the PDU session from the non-3GPP access to the 3GPP access (3e-14a). The AMF having received the registration request performs a registration process with respect to the 3GPP access (3e-14b).

On the other hand, the AMF having received the registration request transmits a message for requesting a PDU session transfer to the SMF managing the corresponding PDU session if the registration in the core network is completed to provide a situation in which the PDU session can be processed (3e-15). The session transfer request message includes a PDU session ID of the PDU session intended to perform the handover, and may also include a HO indication for notifying the handover of the PDU session from the non-3GPP access to the 3GPP access. In response to this, the SMF sends a session transfer response to the AMF to switch a data path toward the 3GPP access side with respect to the corresponding PDU session (3e-16). Accordingly, the AMF makes the gNB set up the resource with the terminal through the N2 request message (3e-17), and the gNB sets up the resource with the terminal (3e-18). The gNB transfers a corresponding ACK to the AMF through 3e-19, sends an SM request to the SMF, and transfers related information to the UPF through an N4 session modification process to switch the data path to the 3GPP access (3e-20, 3e-21, and 3e-22).

Further, the gNB performs a procedure of releasing the resource with respect to the non-3GPP access to complete the handover (3e-23).

FIG. 3F is a diagram of a handover process of a PDU session generated through a non-3GPP access to a 3GPP access using a registration process and a PDU session establishment procedure in case of a terminal of which registration has not been made with respect to the 3GPP access, according to an embodiment.

Referring to FIG. 3F, a terminal 3f-01 that has been successfully registered in the 5G network through the non-3GPP access uses the PDU session generated through the non-3GPP access (3f-11).

If the terminal determines to perform a handover of the PDU session to the 3GPP access (3f-12), in case where the registration has not been made with respect to the 3GPP access (3f-13), the terminal performs registration with respect to the 3GPP access. The terminal generates a PDU session establishment request message with respect to the PDU session intended to perform the handover. The PDU session establishment request message includes a PDU session ID of the PDU session intended to perform the handover, and also includes a HO indication for notifying the handover of the PDU session from the non-3GPP access to the 3GPP access.

The terminal performs registration with respect to the 3GPP access, and the registration request performs piggyback of the generated PDU session establishment request message. The registration request includes a container for transferring a NAS message (e.g., an SM NAS container) and puts the PDU session establishment request message in the SM NAS container to transfer the message to the AMF (3f-14a).

The AMF having received the registration request performs the registration with respect to the 3GPP access (3f-14b).

On the other hand, the AMF having received the registration request recovers and transfers the PDU session establishment request message received together with the registration request to the SMF managing the corresponding PDU session ID (3f-15).

The SMF having received the PDU session establishment request switches a data path toward the 3GPP access side with respect to the corresponding PDU session. Further, the SMF performs a procedure of releasing the resource with respect to the non-3GPP access to complete the handover (3f-23).

The process in which the SMF switches the data path toward the 3GPP access side with respect to the corresponding PDU session is performed through processes 3*f*-16 to 3*f*-22.

If the SMF sends a PDU session establishment accept message to the AMF through the 3GPP access (3*f*-16), the AMF carries the PDU session establishment accept on an N2 request message to be sent to the gNB, and the gNB sets up the resource with the terminal (3*f*-18). The gNB transfers a corresponding ACK to the AMF through 3*f*-19, sends an SM request to the SMF, and transfers related information to the UPF through an N4 session modification process to switch the data path through the 3GPP access (3*f*-20, 3*f*-21, and 3*f*-22).

FIG. 3G is a diagram of a process of paging a terminal when DL data is generated with respect to a PDU session for a 3GPP access in case where the terminal of which registration has been made with respect to the 3GPP access and non-3GPP access is in a CM-IDLE state with respect to the 3GPP access and in a CM-CONNECTED state with respect to the non-3GPP access, according to an embodiment.

Referring to FIG. 3G, a terminal 3*g*-01 that has been registered through the same AMF in the 5G network through the 3GPP access and the non-3GPP access uses the PDU session generated through the 3GPP access (3*g*-11).

If downlink data arrives at a UPF with respect to the PDU session through the 3GPP access in a state where the terminal is in a CM-IDLE state with respect to the 3GPP access (3*g*-13) and is in a CM-CONNECTED state with respect to the non-3GPP access (3*g*-12), the UPF sends a downlink data notification including a PDU session ID to the SMF managing the corresponding PDU session (3*g*-14). Accordingly, the SMF sends an N11 paging request to the AMF in order to request paging for the corresponding terminal (3*g*-15). The N11 paging request message includes the PDU session ID and an identifier for the corresponding terminal, for example, information, such as SUPI, 5*g*-GUTI, or IMSI.

The AMF having received the N11 paging request recognizes that the terminal is in a CM-IDLE state with respect to the 3GPP access and in a CM-CONNECTED state with respect to the non-3GPP access (3*g*-16). Accordingly, the AMF sends a NAS notification message through the non-3GPP access instead of paging the terminal with respect to the 3GPP access. The NAS notification message includes a PDU session ID of the PDU session at which the downlink data has arrived (3*g*-17). Further, the NAS notification message may include access type information notifying that the corresponding PDU session at which downlink data is to be generated relates to the 3GPP access.

The terminal having received the NAS notification message determines whether the terminal itself can use a 3GPP access network (3*g*-18). The terminal checks whether the terminal is out of a coverage of the 3GPP access, and if it is determined that the 3GPP access is available, it sends a service request or a registration request through the 3GPP access in order to activate the corresponding PDU session (3*g*-19*a*), and the AMF having received the service request or the registration request checks if the paging has been successfully completed, and configures a data path capable of transferring the downlink data through performing of PDU session activation to allocate resources.

In contrast, if an access through the 3GPP access is temporarily impossible, such as if the terminal is out of the coverage of the 3GPP access, the terminal checks UE policy, and if it is determined that the PDU session can receive a service through the non-3GPP access, the terminal may attempt to perform a handover of the PDU session through the non-3GPP access. The terminal transmits a PDU session establishment request message through the non-3GPP access (3*g*-19*b*). The PDU session establishment request message includes a PDU session ID of the PDU session intended to perform the handover, and includes an HO indication for notifying the handover of the PDU session from the 3GPP access to the non-3GPP access.

The AMF having received the PDU session establishment request message checks if the paging has been successfully completed, establishes a data path with respect to the non-3GPP access through triggering of the corresponding SMF, and performs a procedure of releasing the resource for the 3GPP access (3*g*-20).

Additionally, if an access through the 3GPP access is temporarily impossible, such as if the terminal is out of the coverage of the 3GPP access, the terminal may send an ACK against the NAS notification to the AMF (3*g*-19*c*). The NAS notification ACK may include an indication notifying that the paging with respect to the 3GPP access has failed, and may also include a cause value indicating the cause of the paging failure. The cause value may indicate that the terminal is out of the 3GPP coverage. The AMF having received the NAS notification ACK may recognize that the paging has failed, and may notify the SMF of the result.

Further, when sending the NAS notification ACK, the terminal checks UE policy, and if it is determined that the PDU session can receive the service through the non-3GPP access, it may attempt to perform the handover of the PDU session through the non-3GPP access. As at 3*g*-19*b*, the terminal may perform the handover to the non-3GPP access by sending a PDU session establishment request. Further, the NAS notification ACK message includes a PDU session ID of the PDU session, and may also include a HO indication for notifying the handover of the PDU session from the 3GPP access to the non-3GPP access. The AMF having received the NAS notification ACK establishes a data path for the non-3GPP access through triggering of the corresponding SMF, and performs a procedure of releasing the resource for the 3GPP access (3*g*-20).

The 5G mobile communication system providing a network slice function may provide different sets of slices for respective registration areas (hereinafter, RAs).

Figure 4A:
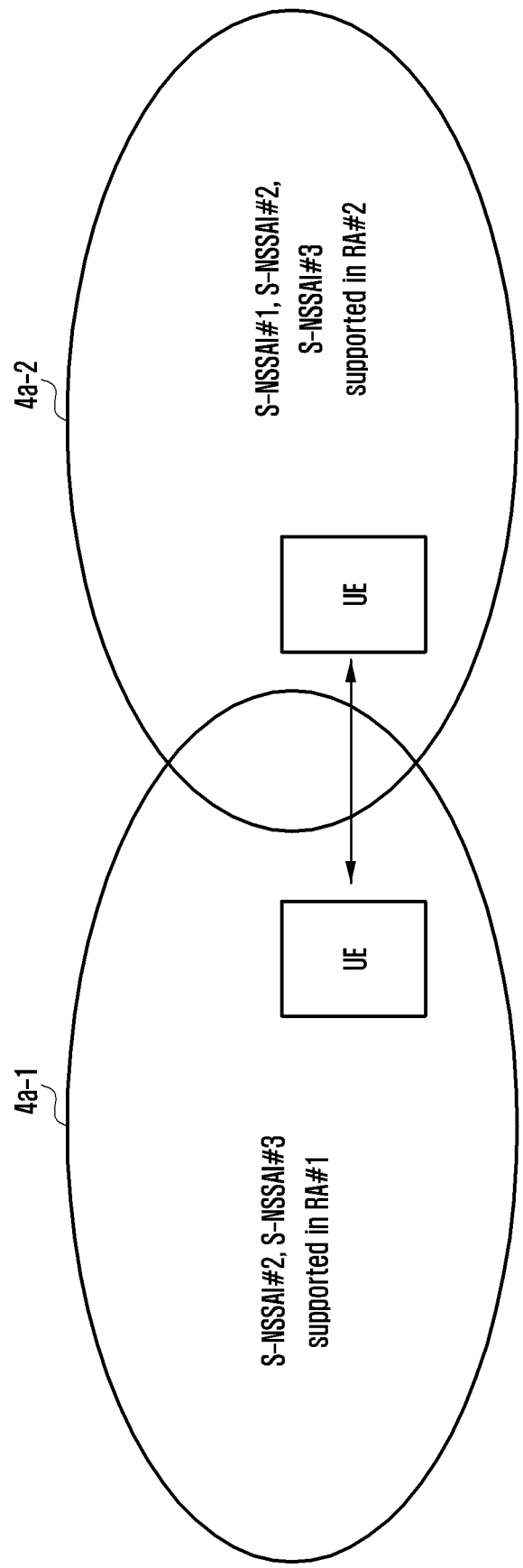
FIG. 4A is a diagram of movement of a terminal in an environment in which a different slice is provided for each registration area, according to an embodiment.

FIG. 4A is a diagram of movement of a terminal in an environment in which a different slice is provided for each registration area, according to an embodiment. Referring to FIG. 4A, in the RA indicated as RA #1 4*a*-1, slice 2 (S-NSSAI #2) and slice 3 (S-NSSAI #3) are provided, and in the RA indicated as RA #2 4*a*-2, slice 1 (SONSSAI #1), slice 2 (S-NSSAI #2), and slice 3 (S-NSSAI #3) are provided. The terminal having accessed the 5G network in RA #1 4*a*-1 to receive a service may move to RA #2 4*a*-2, or may move from RA #2 4*a*-2 to RA #1 4*a*-1. The terminal is required to know information on what slice is provided in the corresponding RA in which the terminal is currently located.

Figure 4B:
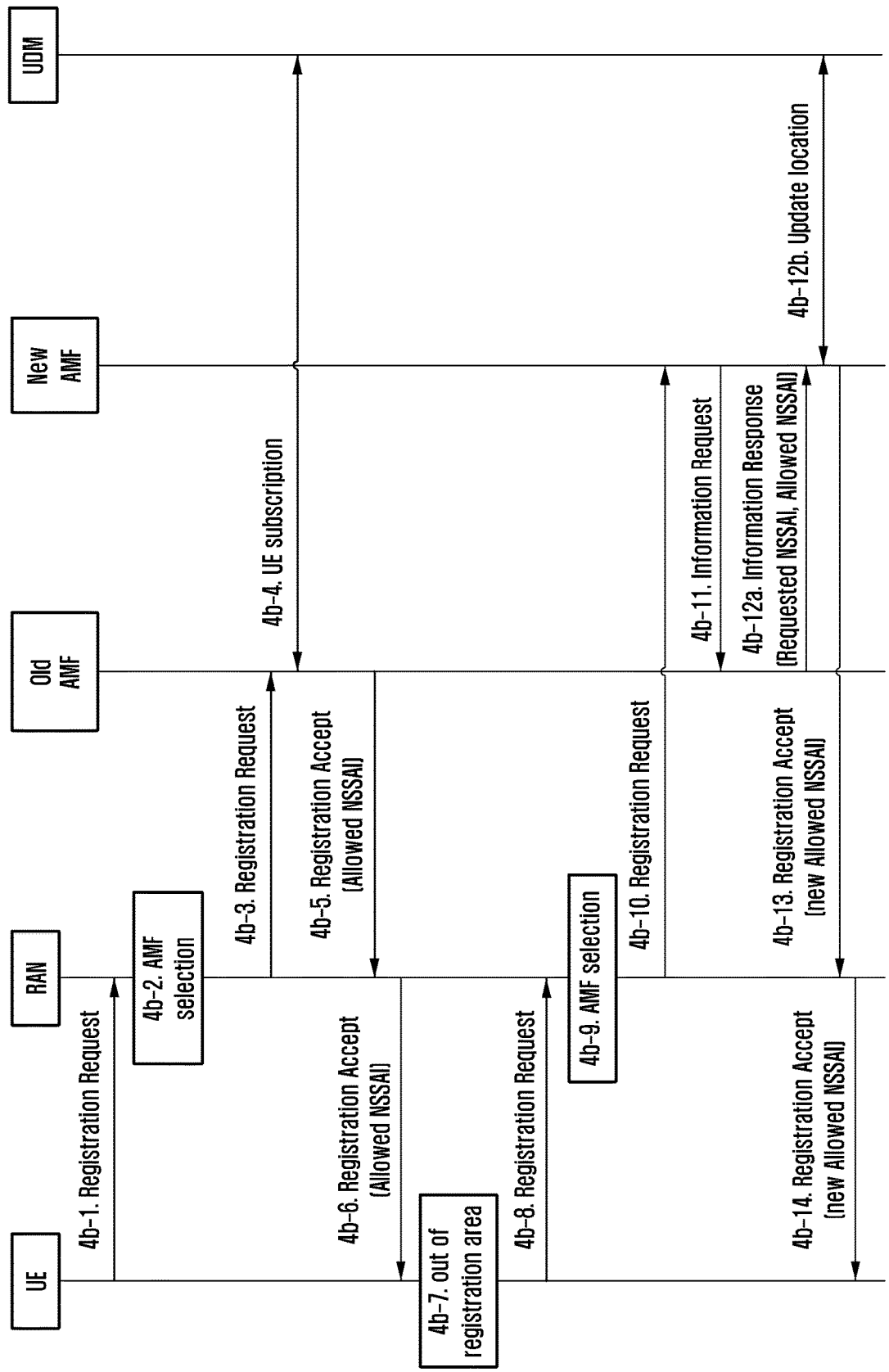
FIG. 4B is a diagram of a procedure in which a new RA exchanges slice information, according to an embodiment.

FIG. 4B is a diagram of a procedure in which a new RA exchanges slice information, according to an embodiment.

Referring to FIG. 4B, if a terminal accessing a 5G network to receive a service moves, and it is sensed that the terminal gets out of the RA area in which the terminal has accessed the 5G network at step 4*b*-7, the terminal sends a new registration request at step 4*b*-8. A RAN may select a new AMF, and transfer a registration request message to the selected AMF. The new AMF having received the message discovers the old AMF in view of a temporary ID of the UE included in the registration request, and requests terminal information from the old AMF (step 4*b*-11). The old AMF transfers terminal related information to the new AMF at step 4*b*-12*a*, and the corresponding message to be sent by the old AMF may include requested NSSAI that the terminal has sent to the old AMF at step 4*b*-1 and allowed NSSAI that the old AMF has sent to the terminal at steps 4*b*-5 and 4*b*-6. The new AMF determines and transfers at steps 4*b*-13 and 4*b*-14 a new allowed NSSAI based on the requested NSSAI and the allowed NSSAI received from the old AMF at step 4*b*-12*a* and the requested NSSAI and terminal subscriber information received from the terminal at steps 4*b*-8 and 4*b*-10. The terminal having received the allowed NSSAI at step 4*b*-14 can be aware of slice information provided by the new RA through identification of S-NSSAI included in the allowed NSSAI.

FIG. 4C is a diagram of a procedure in which a terminal re-requests a temporary rejected slice, according to an embodiment.

Referring to FIG. 4C, at step 4*c*-1, the terminal transmits slice information to be used to access of the 5G network, that is, S-NSSAI, to an AMF as requested NSSAI. The requested NSSAI may include S-NSSAI #1, S-NSSAI #2, and S-NS-SAI #3.

At step 4*c*-3, the AMF having received a registration request message, and the AMF identifies that the S-NSSAI #1 is unable to be provide by a temporary reason in view of the current network situation. The AMF specifies in the allowed NSSAI that the S-NSSAI #1 has been rejected for the temporary reason and the S-NSSAI #2 and S-NSSAI #3 have been granted, and sends the allowed NSSAI to the terminal (steps 4*c*-5 and 4*c*-6).

The terminal having received the allowed NSSAI at step 4*c*-6 is aware of the fact that the S0NSSAI #2 and S-NSSAI #3 among slices requested at step 4*c*-1 have been provided, and uses the corresponding slice.

Thereafter, the AMF can be aware of the fact that the S-NSSAI #1 that is the slice temporarily rejected becomes available again at step 4*c*-7.

Then, the AMF notifies the terminal of this fact through steps 4*c*-8 and 4*c*-9. That is, a notify message at steps 4*c*-8 and 4*c*-9 may include information for notifying that the S-NSSAI #1 is available. Further, the notify message may also include new allowed NSSAI including the S-NSSAI #1.

The terminal having received the notify message at step 4*c*-9 may send, if necessary, a new registration request message at step 4*c*-10. The corresponding registration request may include requested NSSAI determined based on the information notified at step 4*c*-9.

At step 4*c*-11, the AMF having received the registration request may re-confirm and transfer the allowed NSSAI to the terminal through step 4*c*-12 and 4*c*-13.

Additionally, the terminal being aware of the temporary rejection of the S-NSSAI #1 at step 4*c*-6 may operate a timer, and may identify whether the rejected slice becomes available through resending of the registration quest after the timer expires. The registration request may include the requested NSSAI, and the corresponding requested NSSAI may include the S-NSSAI temporarily rejected. The UE may use a preset default value in setting the timer. For example, if the default value is set to 1 hour, the terminal may include the S-NSSAI #1 in the requested NSSAI and may send the registration request message after 1 hour has passed. The default value may be differently set for each slice, that is, S-NSSAI.

Further, when the message notifying that the S-NSSAI #1 has been rejected at step 4*c*-6 is received, the corresponding message may include information on what timer value is to be set. For example, the corresponding message may include information indicating that the re-requested timer value of the S-NSSAI #1 temporarily rejected at step 4*c*-6 is to be set to 2 hours. The UE having received the timer value may include the S-NSSAI #1 in the requested NSSAI, and may send the registration request message after 2 hours have passed.

In FIG. 4D, is a diagram of a session switching procedure for identifying whether a slice has been changed, according to an embodiment.

Referring to FIG. 4D, the terminal receives a requested accept message that includes the allowed NSSAI including the available slice information in the new RA area (4*d*-5). For example, the terminal may move from RA #1 to RA #2 (FIG. 4A).

The terminal can be aware of the fact that the S-NSSAI #1 that is a new slice is additionally available (4*d*-6*a*). Thereafter, if there is traffic to be sent, the terminal determines what slice is to be used to send the traffic by identifying UE policy of the terminal. The terminal may send the traffic using the existing S-NSSAI #2, and then may select the S-NSSAI #1 to send the traffic. Such determination may be made in case where the QoS provided by the S-NSSAI #1 is superior to that provided by the S-NSSAI #2, or the priority of the S-NSSAI #1 is higher than that of the S-NSSAI #2. For this, if necessary, the procedure may be performed by requesting PDU session modification at step 4*d*-7.

Further, the terminal can know that the previously used S-NSSAI is not usable any more (4*d*-6*d*). If there is any traffic to be sent, the terminal may determine through what slice the terminal will send the traffic by identifying UE policy of the terminal, and thus may not transmit the traffic to the unusable S-NSSAI.

Further, according to the present disclosure, although an embodiment is described, in which the terminal performs the handover from the non-3GPP access to the 3GPP access, it is specified that the present disclosure is also applicable even in case of performing the handover of the PDU session in an opposite direction, that is, the handover from the 3GPP access to the non-3GPP access.

In the embodiments, a communication node may include a transceiver that can transmit/receive signals to/from another node, and a controller that can control the operation of the corresponding communication node. The controller may include at least one processor. Further, under the control of the controller, the signals as described above in the embodiments can be transmitted and received, and it can be identified what operation is to be performed based on at least one of the transmitted and received information.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A communication method of an access and mobility function (AMF) node in a communication system, comprising:

receiving, from a terminal via a base station, a first request message including a first registration request;

transmitting, to the terminal, a registration acceptance message indicating that the first registration request has been accepted, the registration acceptance message including at least one of an allowed network slice selection assistance information (NSSAI) and information on rejected single NSSAIs (S-NSSAIs); and transmitting, to the terminal, an update command message including an indication indicating whether a registration procedure from the terminal is necessary and a new allowed NSSAI.

2. The communication method of claim 1, further comprising:

transmitting, to an old AMF previously accessed by the terminal, an information request message for the terminal; and receiving, from the old AMF, an information response message including the allowed NSSAI.

3. The communication method of claim 1, further comprising:

receiving, from the terminal, a second request message including a second registration request, when the indication indicates the registration procedure being necessary, wherein the second registration request includes a requested NSSAI determined based on the new allowed NSSAI.

4. The communication method of claim 1, further comprising:

transmitting, to the terminal, information on a timer associated with the rejected S-NSSAI.

5. A communication method of a terminal in a communication system, comprising:

transmitting, to an access and mobility function (AMF) via a base station, a first request message including a first registration request;

receiving, from the AMF, a registration acceptance message indicating that the first registration request has been accepted, the registration acceptance message including at least one of an allowed network slice selection assistance information (NSSAI) and information on -rejected single NSSAIs (S-NSSAIs); and receiving, from the AMF, an update command message including an indication indicating whether a registration procedure from the terminal is necessary and a new allowed NSSAI.

6. The communication method of claim 5, further comprising:

determining a requested NSSAI based on the new allowed NSSAI; and transmitting, to the AMF, a second request message including a second registration request, when the indication indicates the registration procedure being necessary, wherein the second registration request includes the requested NSSAI.

7. The communication method of claim 5, further comprising:

receiving, from the AMF, information on a timer associated with the rejected S-NSSAI.

8. An access and mobility function (AMF) node in a communication system, comprising:

a transceiver; and a controller coupled with the transceiver and configured to:

control the transceiver to receive, from a terminal via a base station, a first request message including a first registration request, control the transceiver to transmit, to the terminal, a registration acceptance message indicating that the first registration request has been accepted, the registration acceptance message including at least one of an allowed network slice selection assistance information (NSSAI) and information on rejected single NSSAIs (S-NSSAIs), and control the transceiver to transmit, to the terminal, an update command message including an indication indicating whether a registration procedure from the terminal is necessary and a new allowed NSSAI, wherein the update command message notifies whether a registration procedure from the terminal is necessary.

9. The AMF node of claim 8, wherein the controller is further configured to control the transceiver to transmit, to an old AMF previously accessed by the terminal, an information request message for the terminal, and control the transceiver to receive, from the old AMF, the allowed NSSAI.

10. The AMF node of claim 8, wherein the controller is further configured to control the transceiver to receive, from the terminal, a second request message including a second registration request, when the indication indicates the registration procedure being necessary, and wherein the second registration request includes a requested NSSAI determined based on the new allowed NSSAI.

11. The AMF node of claim 8, wherein the controller is further configured to control the transceiver to transmit, to the terminal, information on a timer associated with the rejected S-NSSAI.

12. A terminal in a communication system, comprising:

a transceiver; and a controller coupled with the transceiver and configured to:

control the transceiver to transmit, to an access and mobility function (AMF via a base station, a first request message including a first registration request;

control the transceiver to receive, from the AMF, a registration acceptance message indicating that the first registration request has been accepted, the registration acceptance message including at least one of an allowed network slice selection assistance information (NSSAI) and information on rejected single NSSAIs (S-NSSAIs); and control the transceiver to receive, from the AMF, an update command message including an indication indicating whether a registration procedure from the terminal is necessary and a new allowed NSSAI, wherein the update command message notifies whether a registration procedure from the terminal is necessary.

13. The terminal of claim 12, wherein the controller is further configured to determine a requested NSSAI based on the new allowed NSSAI, and control the transceiver to transmit, to the AMF, a second request message including a second registration request, when the indication indicates the registration procedure being necessary, and wherein the second registration request includes the requested NSSAI.

14. The terminal of claim 12, wherein the controller is further configured to control the transceiver to receive, from the AMF, information on a timer associated with the rejected S-NSSAI.

* * * * *